(12) United States Patent
Bates

(10) Patent No.: US 10,963,724 B2
(45) Date of Patent: Mar. 30, 2021

(54) ABSOLUTE POSITION ENCODER USING A FOCUSED LASER BEAM TO DETECT POSITION CODE WORDS

(71) Applicant: Novanta Corporation, Bedford, MA (US)

(72) Inventor: Allen Bates, Gloucester, MA (US)

(73) Assignee: Novanta Corporation, Bedford, MA (US)

( * ) Notice: Subject to any disclaimer, the term of this patent is extended or adjusted under 35 U.S.C. 154(b) by 45 days.

(21) Appl. No.: 16/371,688

(22) Filed: Apr. 1, 2019

(65) Prior Publication Data

US 2020/0311458 A1 Oct. 1, 2020

(51) Int. Cl.
*G06K 9/18* (2006.01)
*G06K 9/34* (2006.01)
*G11B 7/09* (2006.01)
*G06K 9/72* (2006.01)

(52) U.S. Cl.
CPC .............. *G06K 9/344* (2013.01); *G06K 9/72* (2013.01); *G11B 7/09* (2013.01)

(58) Field of Classification Search
CPC ............. G06K 9/344; G06K 9/72; G11B 7/09
See application file for complete search history.

(56) References Cited

U.S. PATENT DOCUMENTS

| 4,733,069 A | 3/1988 | Narutaki |
| 517,107 A | 4/1992 | Osborne |
| 6,867,412 B2 | 3/2005 | Patzwald et al. |
| 7,274,642 B2 | 9/2007 | Sako et al. |
| 7,461,464 B2 | 12/2008 | Mittmann et al. |
| 10,132,657 B2 * | 11/2018 | Gordon-Ingram ... G01B 11/024 |
| 2006/0013095 A1 | 1/2006 | Liu et al. |
| 2013/0056624 A1* | 3/2013 | Kato .................. G01D 5/34792 250/231.1 |
| 2013/0116959 A1 | 5/2013 | York |

FOREIGN PATENT DOCUMENTS

WO 2015145267 10/2015

\* cited by examiner

*Primary Examiner* — Dhaval V Patel
(74) *Attorney, Agent, or Firm* — BainwoodHuang

(57) ABSTRACT

An absolute position encoder includes a position location medium containing position identifier code words providing absolute position indications, and an optical source, an optical detector, an optics subsystem and a code word decoder. The optics subsystem focuses a source beam onto the position location medium and directs a return beam to the optical detector, detects a focus condition from the return beam, and automatically adjusts focus of the source beam to maintain a predetermined focus condition during operation. The code word decoder responds to the detector signal to detect a code word and generate a decoder output indicative of a corresponding code word value and corresponding detected position.

20 Claims, 24 Drawing Sheets

ABSOLUTE POSITION ENCODER USING A FOCUSED LASER BEAM TO DETECT POSITION CODE WORDS

BACKGROUND

The present invention relates generally to position measurement devices or encoders that measure the position of an encoder relative to a scale.

Absolute position encoders which enable the absolute position of an encoder relative to a scale are known. Such encoders typically comprise a scale having at least one track with unique position data formed continuously along the measuring dimension of the scale. The data can be in the form of, for instance, a pseudorandom bit sequence or discrete code words. By reading this data the encoder can determine the relative absolute position of the encoder and the scale. Absolute position encoders are needed that are of small size, accurate and contamination tolerant.

SUMMARY

Disclosed are a system, method, and an article of manufacture for an absolute position encoder. Broadly defined the system comprises the elements and embodiments described herein to implement an absolute position encoder.

A disclosed absolute position encoder includes a position location medium optical source, optical detector, optics subsystem and code word decoder. The position location medium is patterned to form a set of position identifier code words, the code words each comprising individual portions and providing respective absolute position indications, the code words passing through an interrogation location of the absolute position encoder during operation thereof. The optical source is configured and operative to generate a source beam of optical radiation, and the optical detector is configured and operative to convert a return beam of optical radiation to a corresponding electrical detector signal, the detector signal conveying a property of the return beam resulting from interaction of the source beam with the position location medium at the interrogation location. The optics subsystem is configured and operative to focus the source beam onto the position location medium at the interrogation location and to direct the return beam from the interrogation location of the position location medium to the optical detector, the optics subsystem being further configured and operative to detect a focus condition from the return beam and, in response to the focus condition, automatically adjust the focus of the source beam in a first direction substantially perpendicular to the surface of the position location medium to maintain a predetermined focus condition during operation of the absolute position encoder. The code word decoder is configured and operative in response to the detector signal to detect a code word at the interrogation location and generate a decoder output indicative of a corresponding code word value and corresponding detected position.

The optics subsystem may include a scanning actuator for moving the focal point in a second direction transverse to the first direction and along the position identifier code word, and a transverse actuator for moving the focal point in a third direction that is transverse to the second direction and transverse to the first direction, the moving occurring to maintain tracking of the focal point as it is being scanned along the position identifier code word. The more than one redundant position identifier code words may be separated by a diffraction feature, and the encoder may further include a diffraction detector for detecting a diffraction condition of the return optical beam, wherein the diffraction condition is used to determine the position of the focal point in the third direction.

In one class of embodiments the individual portions of the position identifier code words are arrayed in an x direction of relative movement for which the detected position is indicated, and the second direction is substantially the x direction. A transverse actuator may move the focal point in a third direction that is transverse to the second direction and transverse to the first direction, the moving occurring to maintain tracking of the focal point as it is being scanned along the position identifier code word.

In another class of embodiments the individual portions of the position identifier code words are arrayed in a y direction transverse to an x direction of relative movement for which the detected position is indicated, and the second direction is substantially the y direction. A transverse actuator may move the focal point in a third direction that is substantially the x direction, the moving occurring to move the focal point between successive code words and to maintain tracking of the focal point as it is being scanned along each position identifier code word.

The optics subsystem may include a focus lens, focus detector, focus actuator and focus control system. The focus lens may be configured and operative to focus the source optical radiation beam to a focal point on the position identifier code word, the focus lens receiving a reflected optical beam from the position identifier code word to produce the return beam. The focus detector may be configured and operative to detect the focus condition from the return beam, and the focus actuator configured and operative to move the focus lens in the first direction to move the focal point relative to the position identifier code word in the first direction. The focus control system may be configured and operative to receive the focus condition from the focus detector and control the focus actuator to maintain the focal point upon the code word.

In the absolute position encoder, the individual portions of the position identifier code word may comprise on or more of reflectivity variations, polarization variations, and phase pit variations in the position location medium. Each position identifier code word may comprise a data portion and an error correction portion.

A method is also disclosed for determining an absolute position using an absolute position encoder, the absolute position encoder including a position location medium, an optical source, an optical detector, an optics subsystem and a code word decoder, the position location medium being patterned to form a set of position identifier code words each comprising individual portions and providing respective absolute position indications, the code words passing through an interrogation location of the absolute position encoder during operation thereof, the optical source configured and operative to generate a source beam of optical radiation, the optical detector configured and operative to convert a return beam of optical radiation to a corresponding electrical detector signal, the detector signal conveying a property of the return beam resulting from interaction of the source beam with the position location medium at the interrogation location, the optics subsystem configured and operative to focus the source beam onto the position location medium at the interrogation location and to direct the return beam from the interrogation location of the position location medium to the optical detector. The method includes, by the optics subsystem, detecting a focus condition from the return beam and, in response to the focus condition, automatically adjusting the focus of the source beam in a first direction substantially perpendicular to the surface of the position location medium to maintain a predetermined focus condition during operation of the absolute position encoder; and, by the code word decoder, in response to the detector signal, detecting a code word at the interrogation location and generating a decoder output indicative of a corresponding code word value and corresponding detected position.

Additionally disclosed is an article of manufacture including a data storage medium tangibly embodying a program of machine-readable instructions executable by a digital processing apparatus to perform method steps described herein for determining an absolute position using an absolute position encoder.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different views.

DETAILED DESCRIPTION

Figure 1:
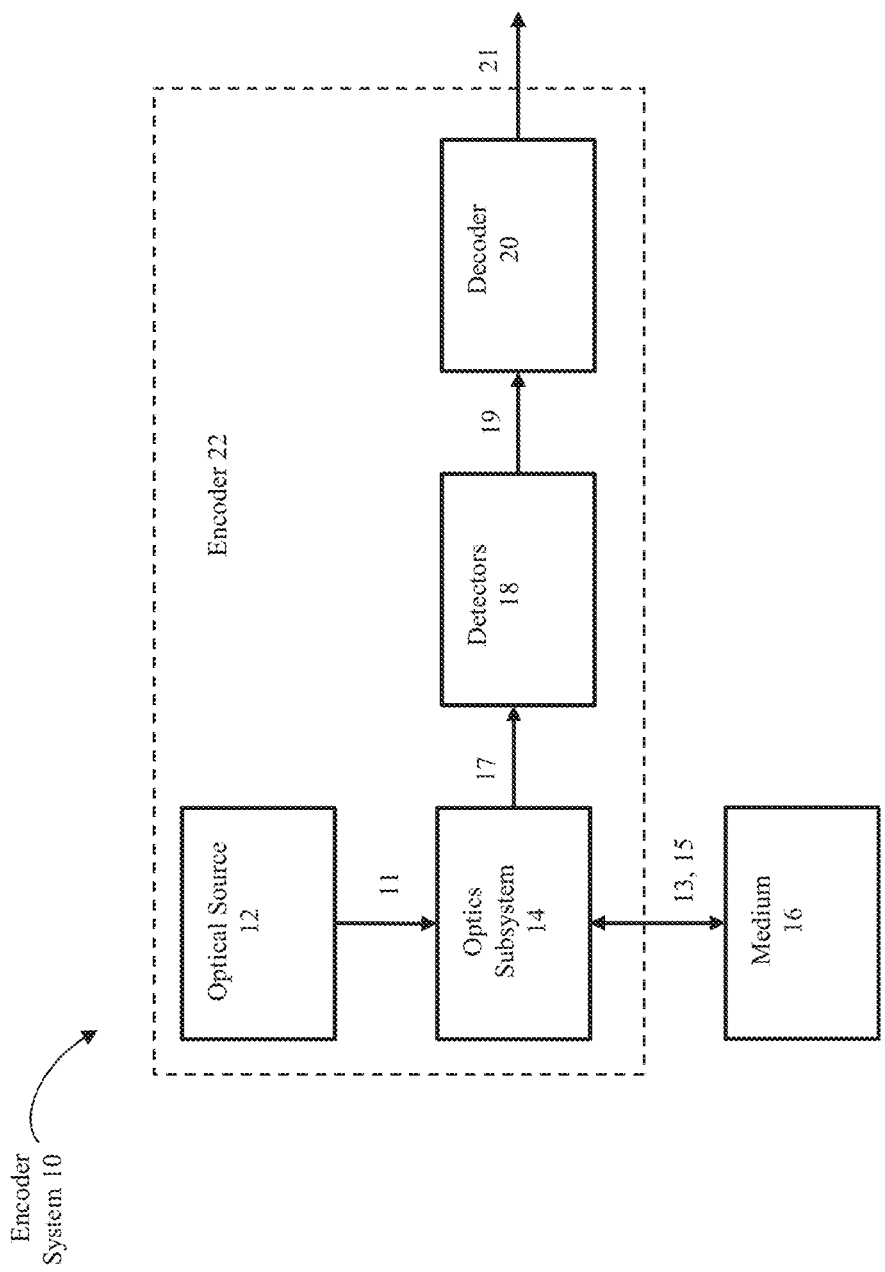
FIG. 1 is a block diagram of an absolute position encoder.

FIG. 1 is a block diagram of an absolute position encoder system 10. It includes an optical source 12, optics subsystem 14, position location medium 16, optical detectors 18 and decoder circuitry 20. Generally the encoder system 10 is utilized for detecting the position of a mechanical element that bears the position location medium 16 relative to a mechanical structure that typically contains the remaining components. For example, the mechanical element may be a linear member moving axially or rotationally with respect to a mechanical frame, housing or other structure. In the present description the collection including the source 12, optics subsystem 14, detectors 18 and decoder 20 is referred to as the "encoder" 22, which reflects that in many applications this collection of components are housed together and separate from the position location medium 16. In this description the term "encoder" is also used to refer to the overall encoder system 10 (which includes the medium 16), and it should be clear in context what is being referred to.

In operation, the optical source 12 generates a source optical radiation beam 11 that is provided to the optics subsystem 14. The optics subsystem performs beam steering and related optical operations as described more below, to generate a focused beam 13 incident on the position location medium 16 at a location referred to as an "interrogation region". By either reflection or transmission, the interaction of the focused beam 13 with the medium 16 generates a return beam 15 supplied back to the optics subsystem 14, which performs additional beam steering etc. to generate one or more detection beams 17 provided to the detectors 18. The detectors 18 perform optical-to-electrical conversion to generate corresponding detection signals 19, provided to the decoder 20, which performs certain processing to generate position indication signals 21 that are used by separate system-level components in the application environment of the encoder system 10. For example, such system-level components may make up a servo controller or other type of mechanical position controller that is responsible for precise positioning of the mechanical component that bears the position location medium 16, using the position information from the encoder system 10.

Figure 2:
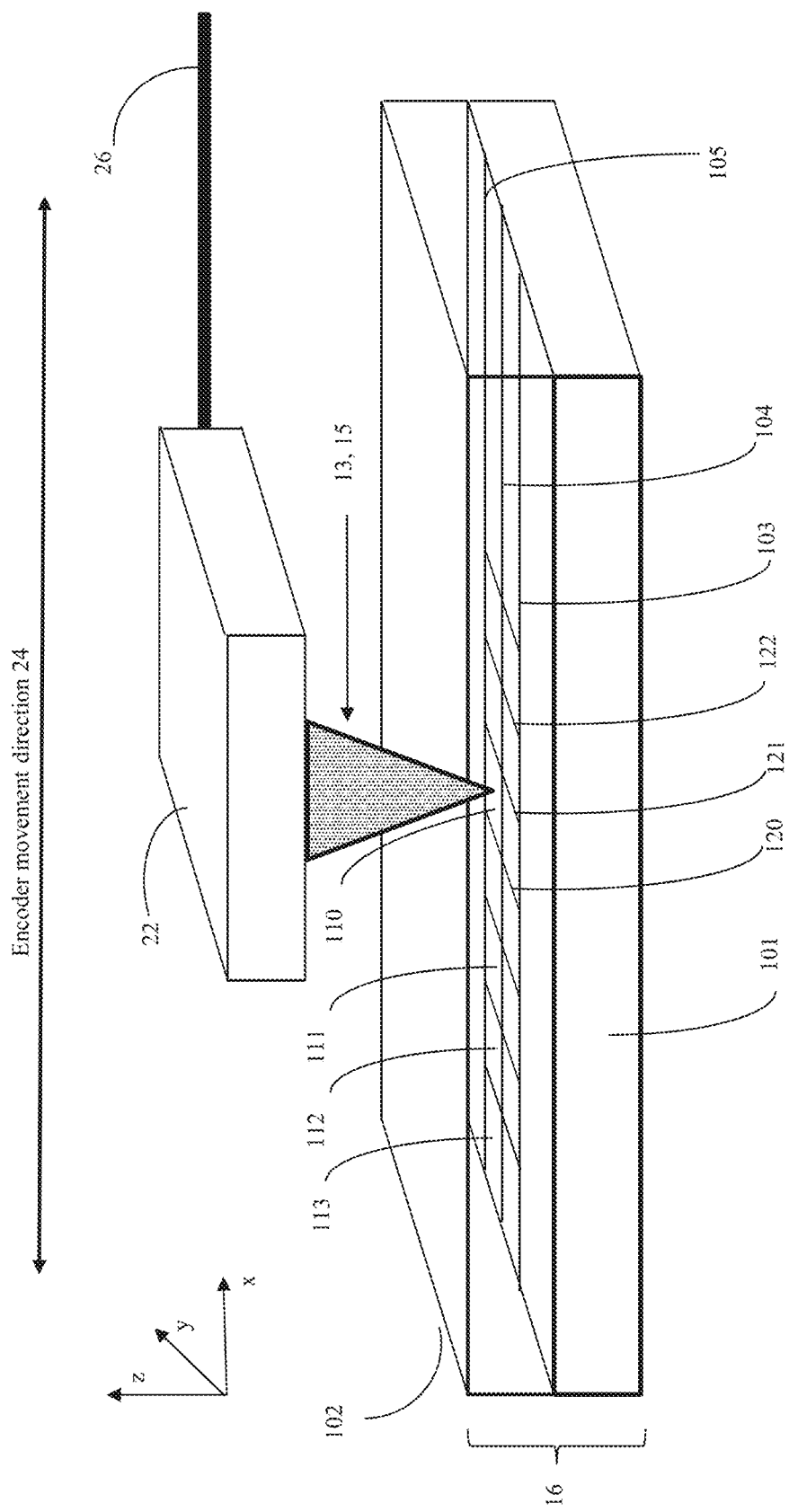
FIG. 2 is a schematic diagram of an absolute position encoder and position location medium.

FIG. 2 is a quasi-mechanical depiction of the encoder system 10. At upper left is shown a set of coordinate axes that provide directional references in this description. The "x" direction is a direction of relative movement, shown as encoder movement direction 24, for which the encoder 10 provides a position indication. The "y" direction extends orthogonally, transverse to the movement direction 24 in a plane parallel to the medium 16. The "z" direction extends orthogonally to both x and y, in the direction of separation between the encoder 22 and the medium 16. FIG. 2 shows a linear position encoder system 10 in which relative movement is purely linear. Another class of encoders, examples of which are shown below, are rotary position encoders in which the relative movement is rotational. In rotary position encoders, the x and y directions are conventionally understood as angular and radial directions, respectively.

The encoder 22 is arranged opposite the position location medium 16. The focused beam 13 is directed to a focal point on a code word 110 located in or on a code word medium 101 of the position location medium 16, and by reflection a return beam 15 is produced. The position location medium 16 includes a protective medium 102 and code word medium 101, in addition to an underlying substrate as described more below. In alternative embodiments, position location medium 16 may not include protective medium 102 and/or substrate. Protective medium 102 may be of sufficient thickness in the z direction that any contamination on the surface of protective medium 102 does not significantly affect the quality of the focal point on a code word 110. Additionally protective medium 102 provides environmental protection for code word medium 101.

Absolute position encoder 22 and position location medium 16 may be separated by air, a gas or any other medium that allows free movement of absolute position encoder 22 relative to position location medium 16. In one usage, position location medium 16 is attached to a machine or other apparatus and absolute position encoder 22 moves along encoder movement direction 24. In alternative usage, absolute position encoder 22 is attached to a machine or other apparatus and position location medium 16 moves along encoder movement direction 24. In any usage, as relative motion occurs between the absolute position encoder 22 and position location medium 16 along encoder movement direction 24, an absolute position value is output from absolute position encoder 22 via a communications cable 26.

Position location medium 16 includes more than one unique position identifier code word (e.g., code words 110, 111, 112, 113), located in or on code word medium 101. In one embodiment, multiple unique position identifier code words are located along encoder movement direction 24. Each unique position identifier code word identifies an absolute position of the position location medium 16 relative to absolute position encoder 22 along encoder movement direction 24. In this description, position identifier code words (e.g., code words 110, 111, 112, 113), are exaggerated in size for illustration purposes.

Figure 3:
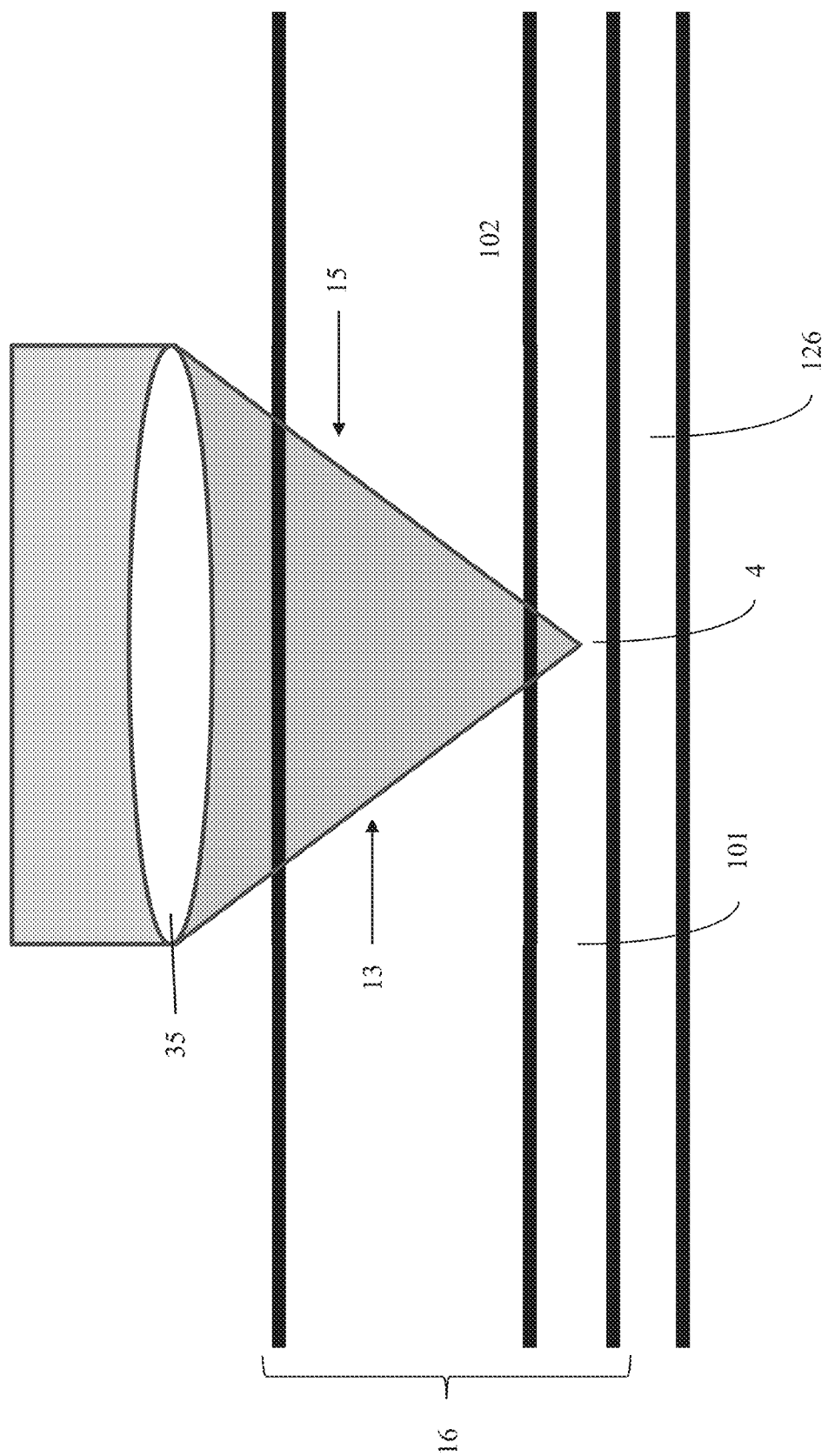
FIG. 3 is a diagram depicting a focus lens focusing an optical radiation beam to a focal point on a code word layer of a position location medium.

FIG. 3 is a schematic side view showing additional detail. The focal point 4 is located in or on the code word medium 101, which in this embodiment is immediately adjacent a substrate 126. Also shown is a focus lens 35 used to create the focused beam 13 and to collimate the return beam 15 for processing within the optics subsystem 14 (FIG. 1). Additional details of structure and operation of the optics subsystem 14 are given below.

Figure 4:
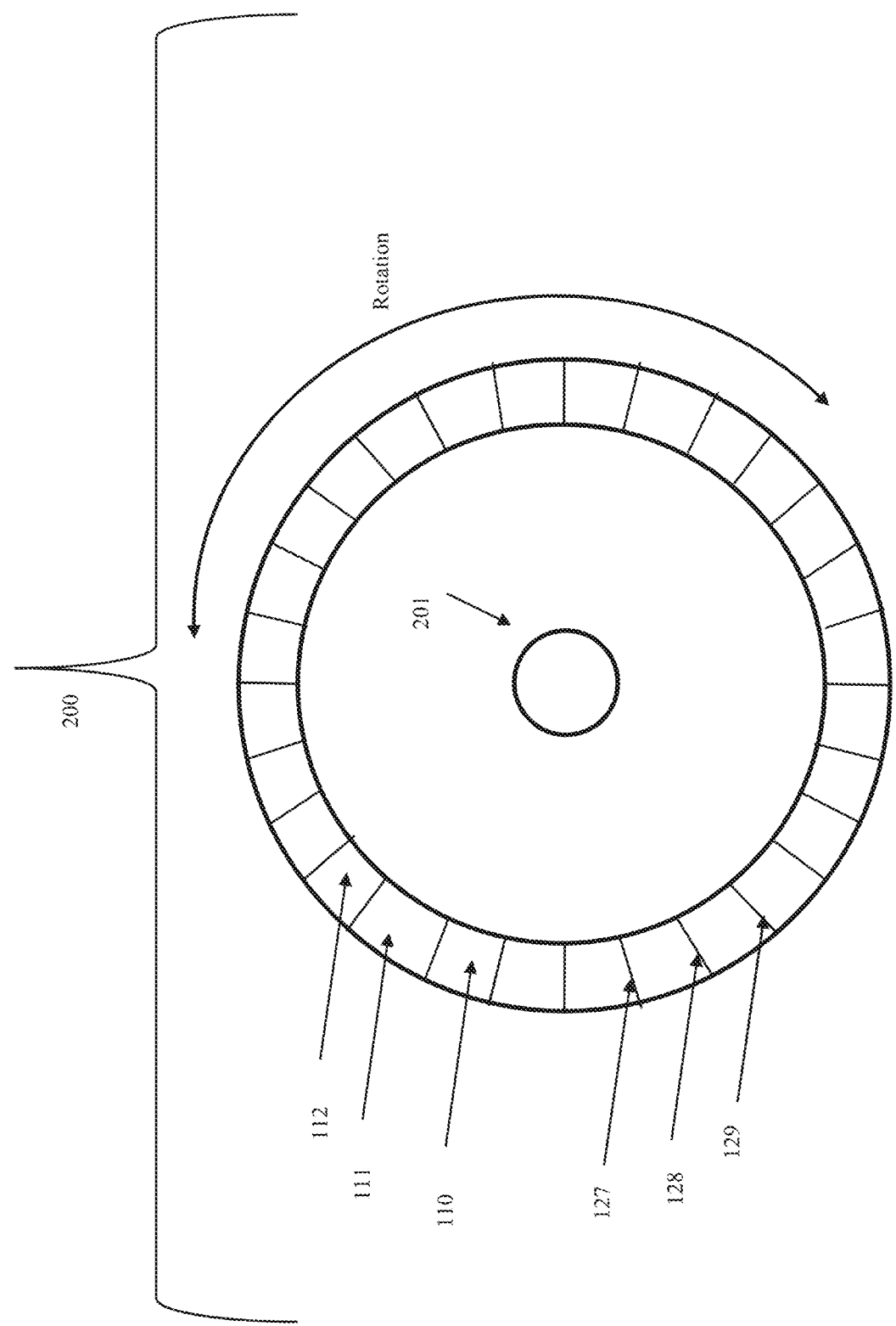
FIG. 4 is a schematic diagram of a circular shaped position location medium with radial diffraction features.
Figure 5:
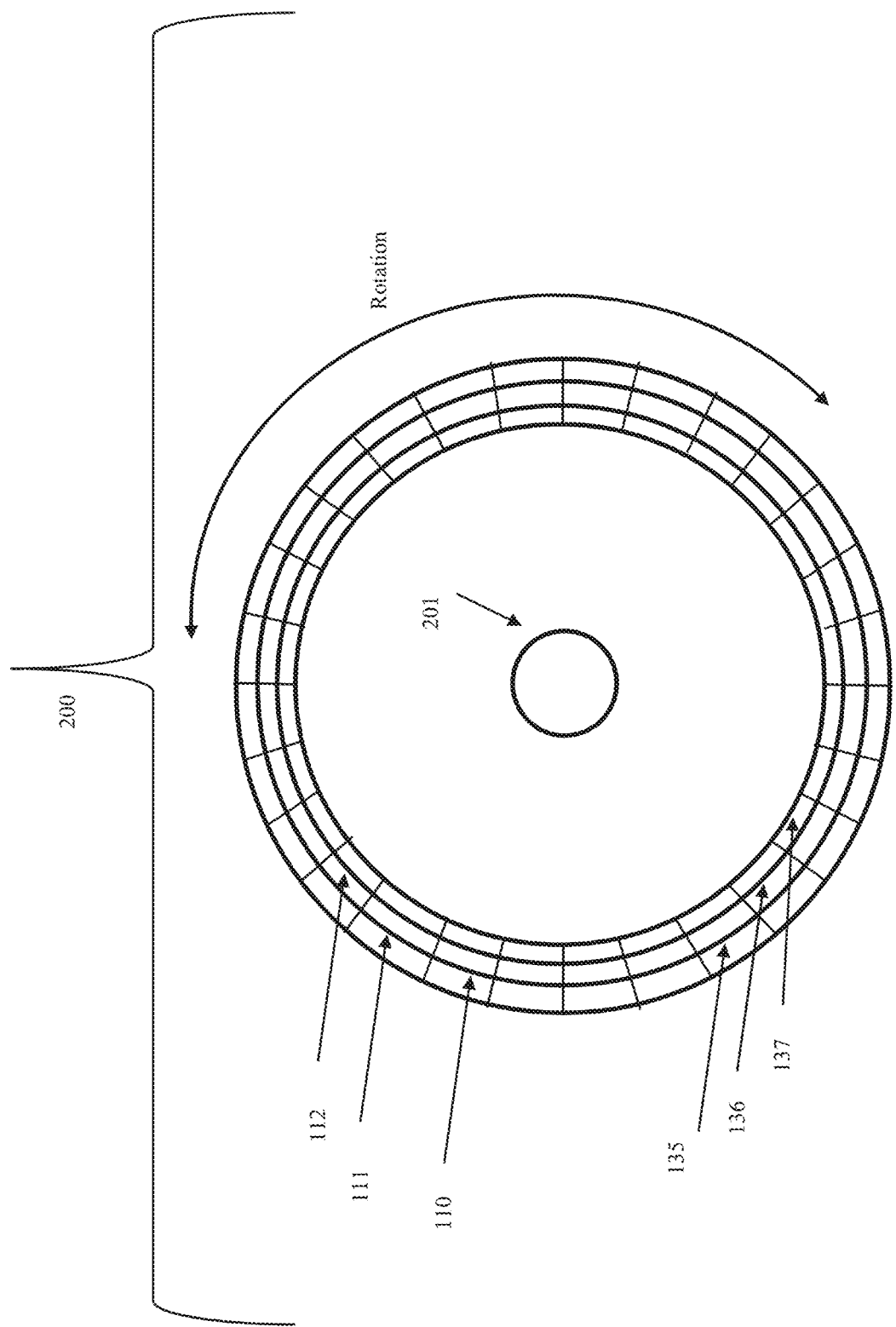
FIG. 5 is a schematic diagram of a circular shaped position location medium with radial and circular diffraction features.

FIGS. 4 and 5 show alternative position location mediums 200A, 200B that may be used with absolute position encoder 22 to implement a rotary absolute position encoder. For ease of description, a generic reference 200 used to refer equally to either of these embodiments. Position location medium 200 has similar structure as position location medium 16 except being circular, and generally includes more than one unique position identifier code word (e.g., code words 110, 111, 112) located in or on its code word medium. Code words 110, 111, 112 may be separated by diffraction features (e.g., 127, 128, 129) and/or circular diffraction features (i.e. 135, 136, 137). Position location medium 200 may rotate on a center shaft 201 and used to measure the absolute position and/or rotation of an apparatus that center shaft 201 is attached to. In the descriptions and examples that follow, either type of position location medium (i.e. 16 or 200) may be used to implement an absolute position encoder.

Figure 6:
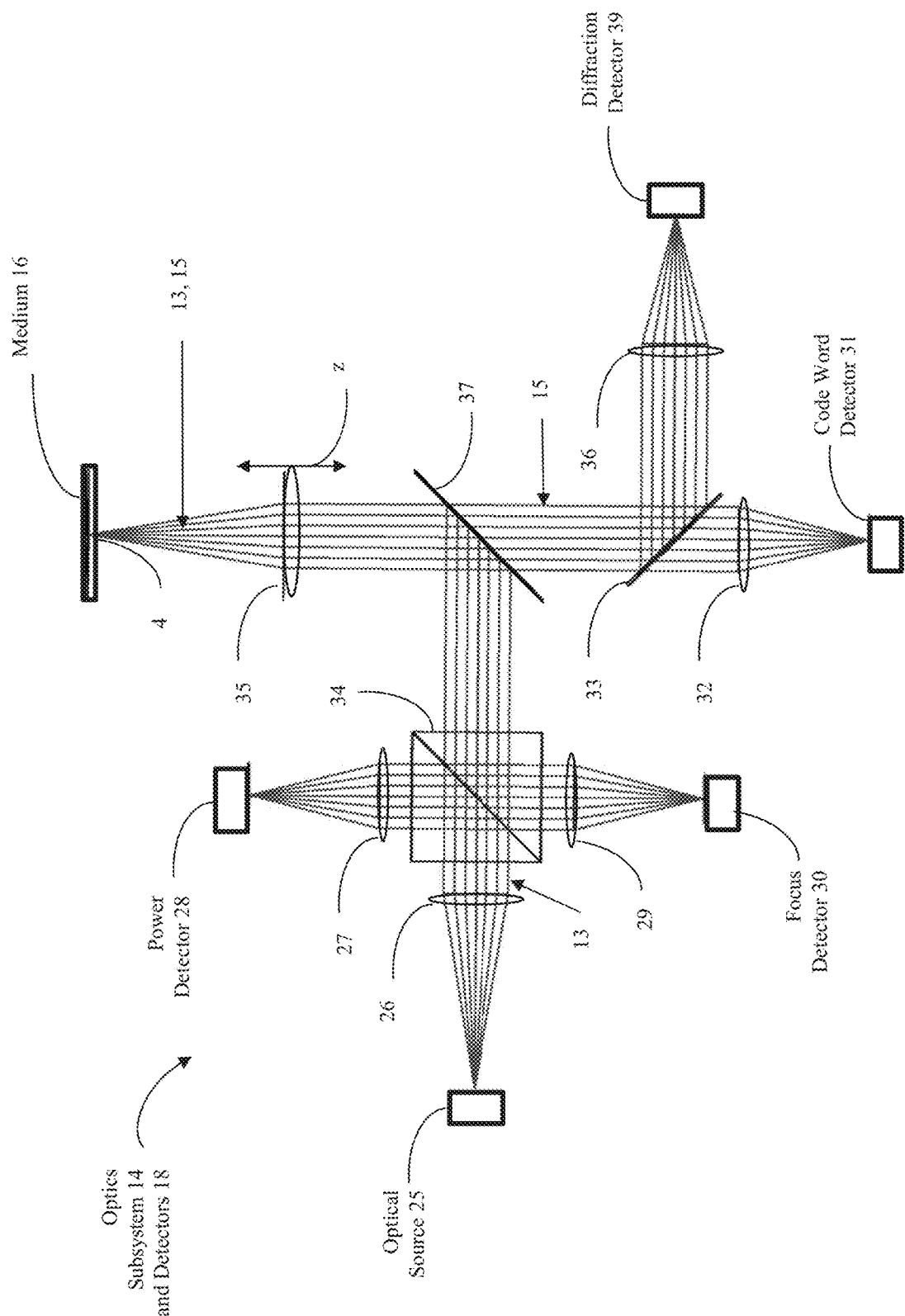
FIG. 6 is an optical schematic diagram of the absolute position encoder.

FIG. 6 shows an embodiment of the optics subsystem 14 of absolute position encoder 22. Light from an optical radiation source 25 is refracted by lens 26 to provide source optical radiation beam 13. Source optical radiation beam 13 is distributed throughout the optical system as shown. Beamsplitter 34 provides a small portion of optical radiation beam 13 to lens 27. Lens 27 focuses the small portion of optical radiation beam 13 on power detector 28. Power detector 28 is used by a power control system (described below) to maintain a constant optical radiation power at focal point 4. Source optical radiation beam 13 exits beamsplitter 34 and is reflected by partially reflecting mirror 37 towards focus lens 35. Focus lens 35 focuses source optical radiation beam 13 to a focal point 4 on code word 110 located in or on position location medium 16. Focus lens 35 collimates the return optical beam 15 from code word 110 and directs it back to the partially reflecting mirror 37, which directs a portion of the return optical beam 15 to beamsplitter 34 and another portion to a partially reflecting beamsplitter 33. Beamsplitter 34 reflects a portion of the return optical beam to lens 29, which focuses the return optical beam 15 on a focus detector 30 for detecting a focus condition, as described more below. In operation, a focus actuator (not shown in FIG. 6) moves focus lens 35 in the z direction to move focal point 4 relative to position identifier code word 110 in the z direction. A focus control system (also not shown; see below) receives the focus condition from focus detector 30 to control the focus actuator to maintain focal point 4 in focus on code word 110.

A lens 36 focuses a portion of return optical beam 15 that is reflected by partially reflecting beamsplitter 33 on a diffraction detector 39, and another portion to lens 32 which focuses the portion of the return optical beam 15 on a code word detector 31. Code word detector 31 detects individual portions of position identifier code words (i.e. 110, 111, 112, 113), as described more below. Function and use of the diffraction detector 39 is also described more below.

In one embodiment, the direction of travel of the beams 13, 15 and the direction of movement of the focus lens 35 is precisely in the z direction, perpendicular to the surface of the medium 16. However, more generally, substantial perpendicularity suffices, e.g., in a range of +/−10 degrees from perpendicular, or more in alternative embodiments.

FIGS. 7-13 illustrate a first class of embodiments that are described partly in relation to a scanning direction 180 and a transverse direction 190, which are defined in relation to the encoder 22. A scanning actuator moves the optical beam 13 in the scanning direction 180, and a transverse actuator moves the optical beam 13 in the transverse direction 190. In the embodiments of FIGS. 7-13, the scanning direction 180 aligns with the x direction of relative movement (FIG. 2), and the transverse direction 190 aligns with the y direction. In another class of embodiments described below with reference to FIGS. 14-17, the scanning direction 180 aligns with the y direction, and the transverse direction aligns with the x direction. These two classes of embodiments may be realized using the same type of encoder 22, just rotating it 90 degrees and perhaps making software or other adjustments as necessary.

Figure 7:
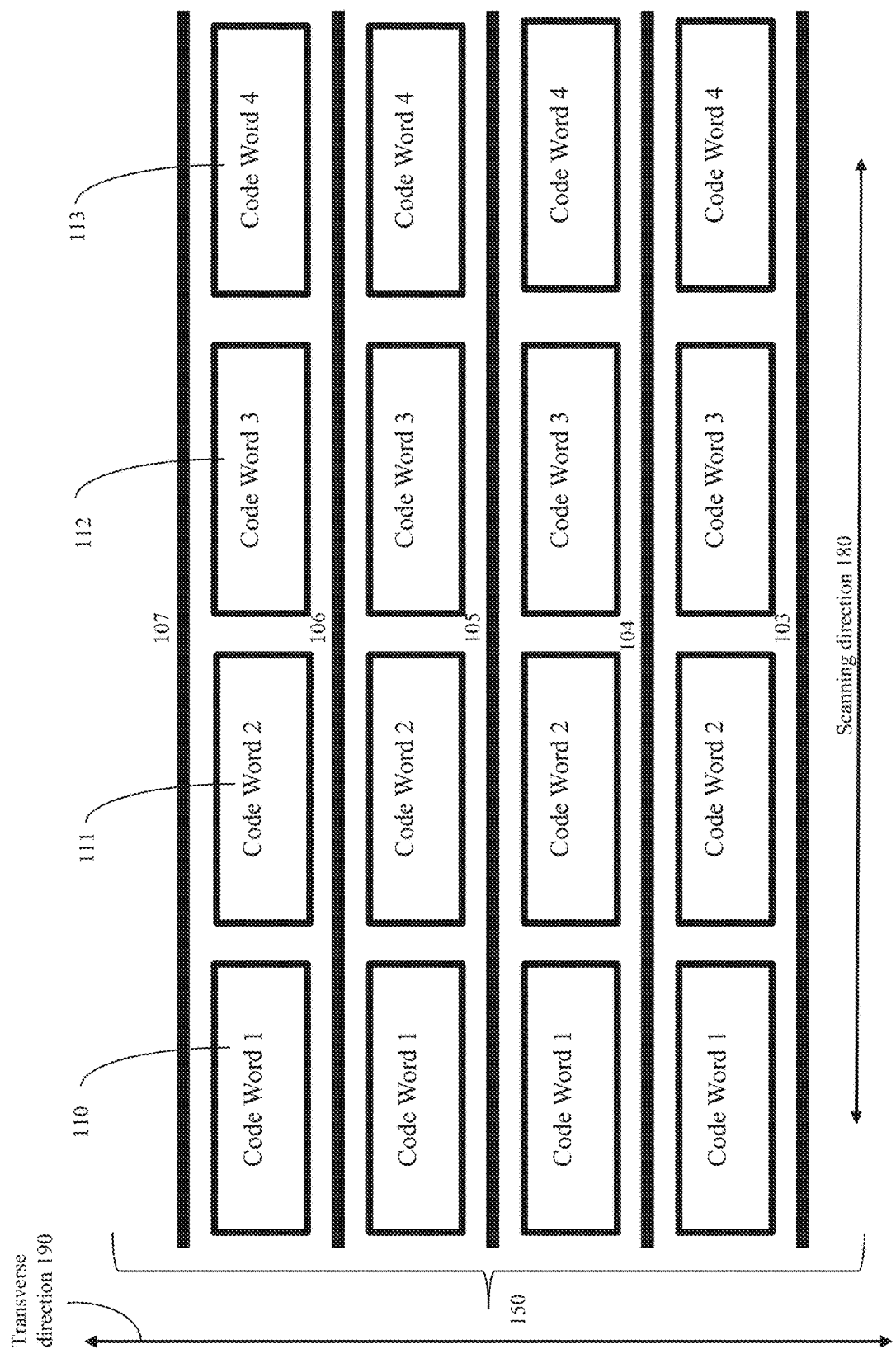
FIG. 7 is a schematic illustration of absolute position code words in a position location medium.

FIG. 7 show that in one embodiment 150, redundant code words 110, 111, 112, 113 are separated by diffraction features (i.e. 103, 104, 105, 106, 107). Diffraction detector 39 (FIG. 6), which detects a diffraction condition of return optical beam 15, is used to determine the position of focal point 4 in a direction indicated as transverse direction 190. In this embodiment, a transverse actuator (described below) is used to access any of the replicated instances of code words 110, 111, 112, 113 in the transverse direction 190. If, for example, an error is detected in any of the code words 110, 111, 112, 113 along a scanning direction 180, the focal point 4 may be moved by the transverse actuator to access another instance of the code word replicated in the transverse direction. A tracking control system (described more below) is used to maintain or determine the position of focal point 4 in the transverse direction. In some embodiments, tracking control system may be used to count the number of diffraction features (i.e. 103, 104, 105, 106, 107) traversed and place focal point 4 at an optimum or desired location relative to code words 110, 111, 112, 113. In other embodiments, tracking control system may be used to count the number of diffraction features (i.e. 103, 104, 105, 106, 107) traversed and determine the position of encoder 22 relative to position location medium 16 in the "y" direction while simultaneously determining the absolute position in the "x" direction.

Figure 8:
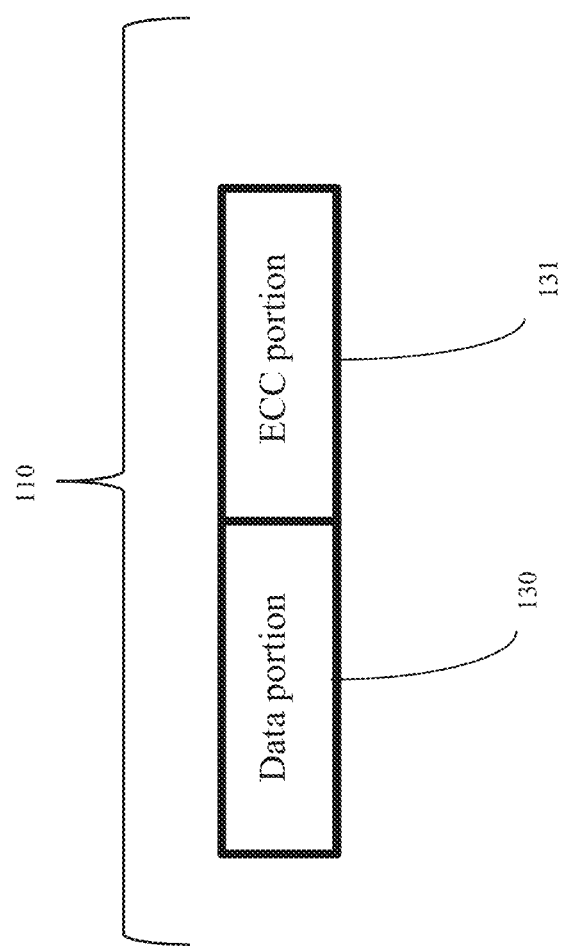
FIG. 8 is a schematic illustration of absolute position code word data and ECC portions.

FIG. 8 illustrates that in one embodiment the code words (e.g., 110 as shown) may include a data portion 130 and an error correction code (ECC) portion 131. The data portion 130 and ECC portion 131 each includes individual portions or bits.

Figure 9:
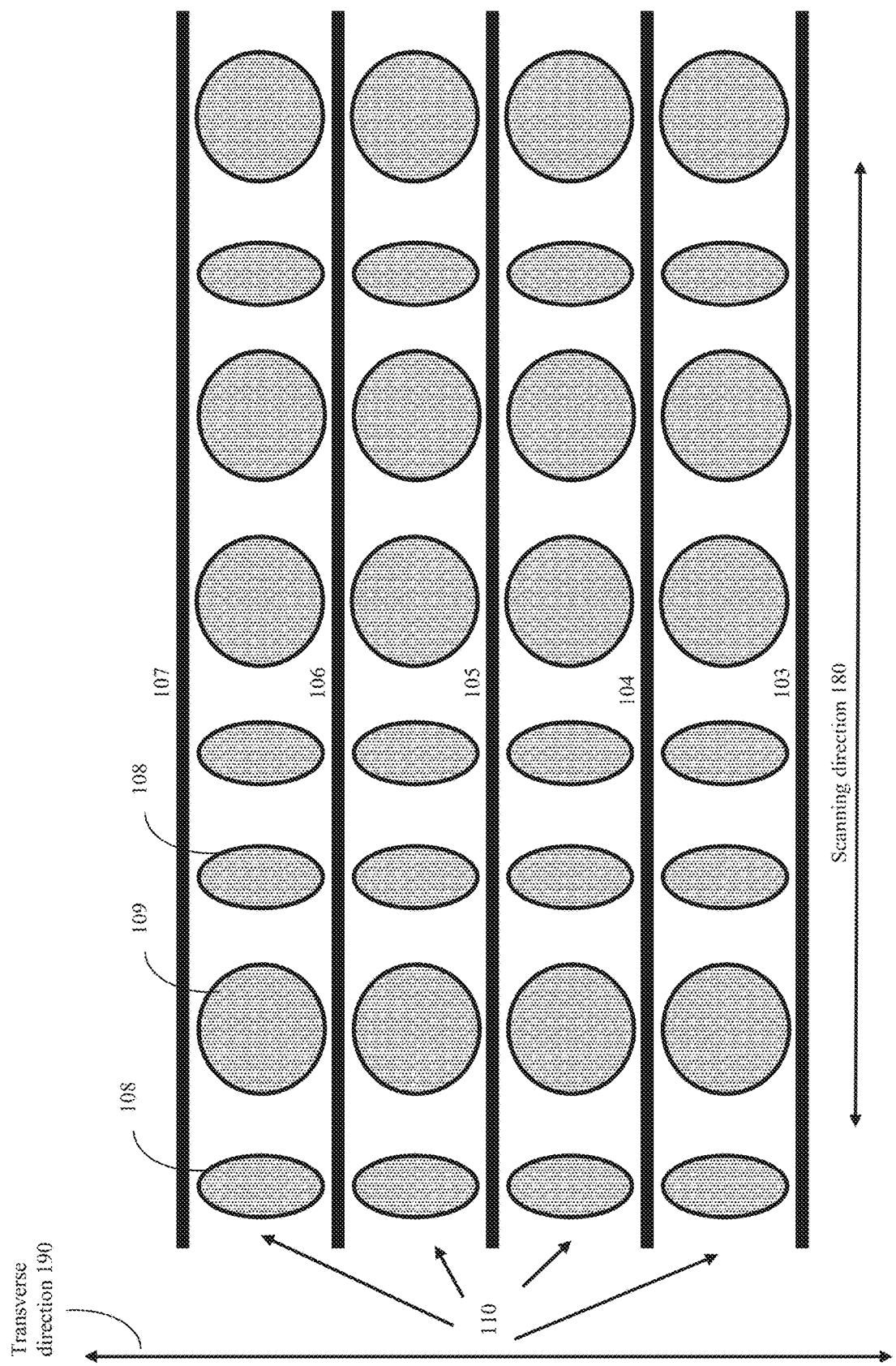
FIGS. 9-11 are schematic diagrams illustrating examples of individual portions of absolute position code words in a position location medium.
Figure 10:
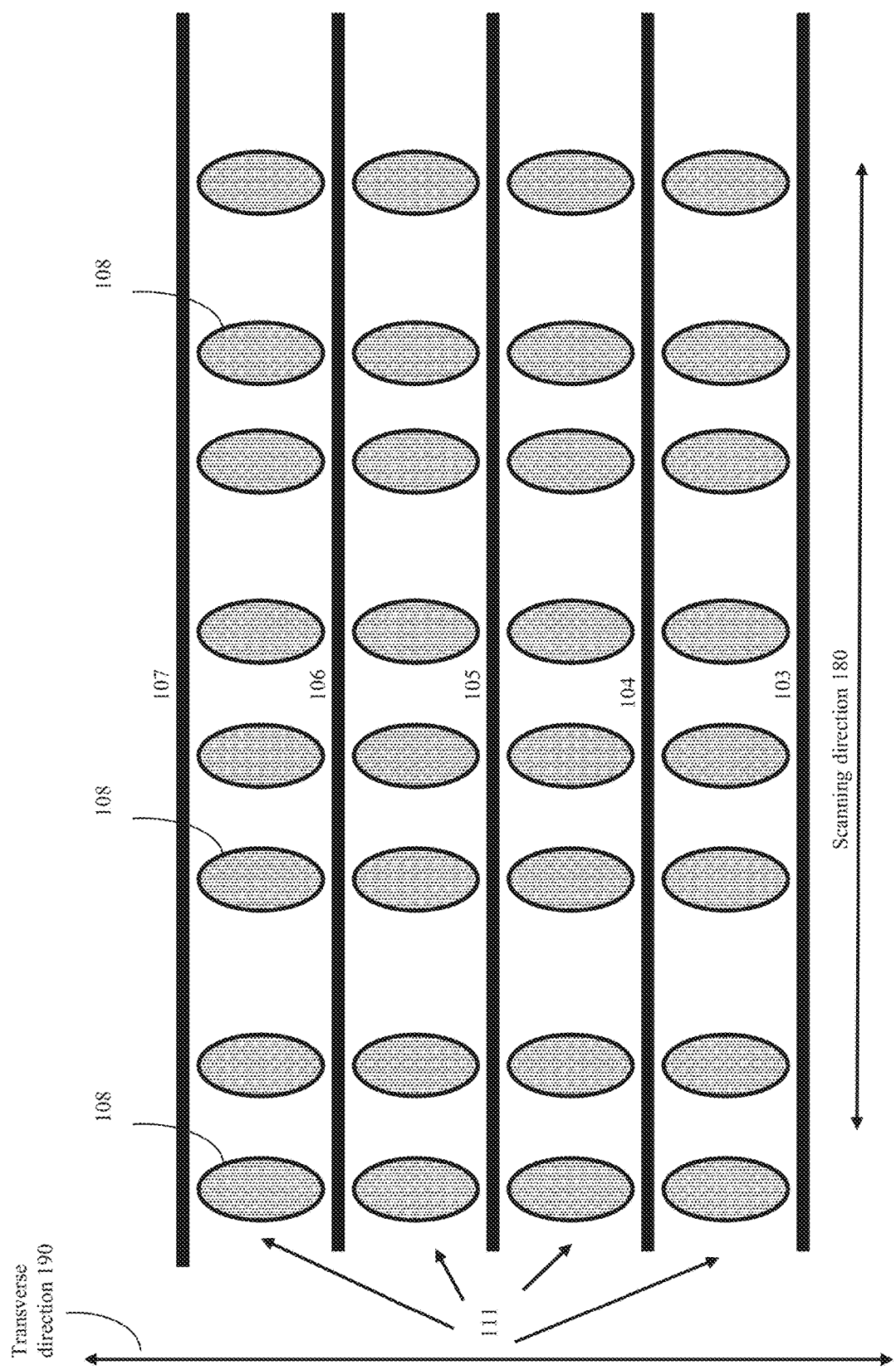
Figure 11:
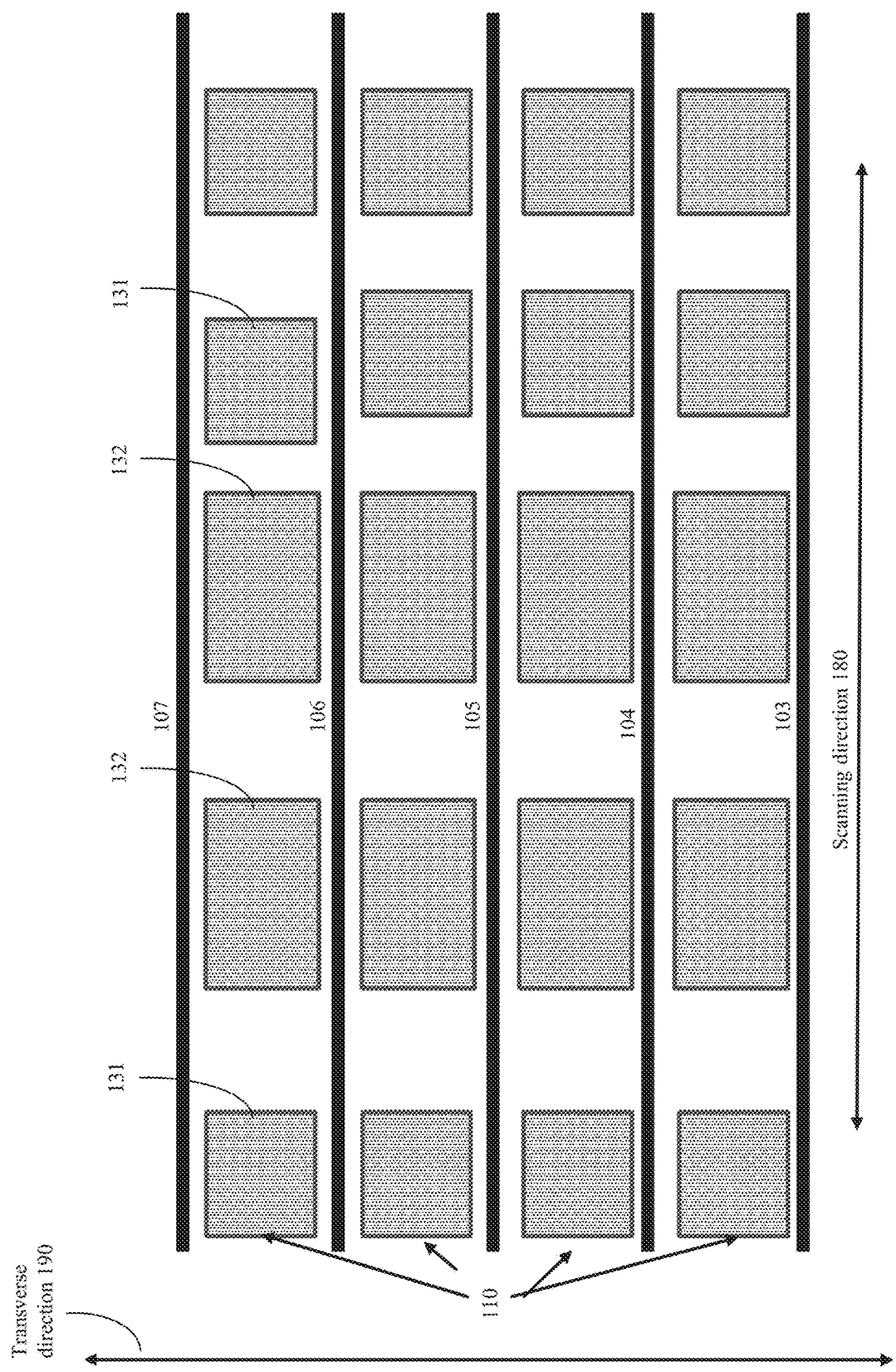

FIGS. 9-11 illustrate examples of embodiments of individual portions 108, 109, 131, 132 or bits of a code word (e.g., 110) separated by diffraction features 103, 104, 105, 106, 107. These figures illustrate that the individual portions 108, 109, 131, 132 or bits of a code word 110 may be used to make up a data portion 130 and an ECC portion 131 by different size, shape or spacing of the individual portions 108, 109, 131, 132 or bits of a code word 110. The length of code words 110, 111, 112, 113 varies depending upon the application. For example, in some embodiments, the length of data portion 130 and an ECC portion 131 may be determined first by the number of bits needed to represent the length of position location medium 16 and the desired ECC strength needed. For example, if the length of position location medium 16 is 2 meters long and a code word (i.e. 110) is approximately 20 um long then 16,000 code words 110, 111, 112, 113 are needed to provide a unique position for each code word 110, 111, 112, 113. For example, if individual portions 108, 109, 131, 132 or bits of a code word 110 are spaced approximately 1.0 um, then each code word 110, 111, 112, 113 may include 20 individual portions 108, 109, 131, 132 or bits including spaces. For 16,000 code words 110, 111, 112, 113, 17 bits are needed ($2^{17}$=131072) to provide a unique data portion 130 for each location on position location medium 16. For this example, 3 bits remain for ECC portion 131. One skilled in the art could optimize the number of bits, size of each bit, code word length, code word sequence (i.e. sequential, pseudo random, etc.), data portion 130, and ECC portion 131 for each specific application. ECC portion 131 is preferably optimized for robustness of reading of the data portion 130. For example, depending upon the method used to implement each individual portion 108, 109, 131, 132 or bit of a code word 110 more or less ECC portion 131 may be needed depending upon the resulting signal detected by code word detector 31. In one embodiment the individual portions 108, 109, 131, 132 or bits of a code word 110 include reflectivity variations of position location medium 16, 200. In another embodiment the individual portions 108, 109, 131, 132 or bits of a code word 110 include polarization variations of position location medium 16, 200. In yet another embodiment the individual portions 108, 109, 131, 132 or bits of a code word 110 include phase pit variations of position location medium 16, 200. Phase pit variations may be implemented by embossing position location medium 16 with individuals bits with a height that is a prescribed fraction of the wavelength of the optical radiation used in absolute position encoder 22. One skilled in the art, could design the height of the phase pits to produce reflectivity variations to represent each bit of for example, code word 110, 111, 112, 113. In any of above embodiments, code word detector 31 and/or the optical design (i.e. FIG. 5) could be modified to accommodate the specific method that individual portions 108, 109, 131, 132 are implemented in code word 110.

Figure 12:
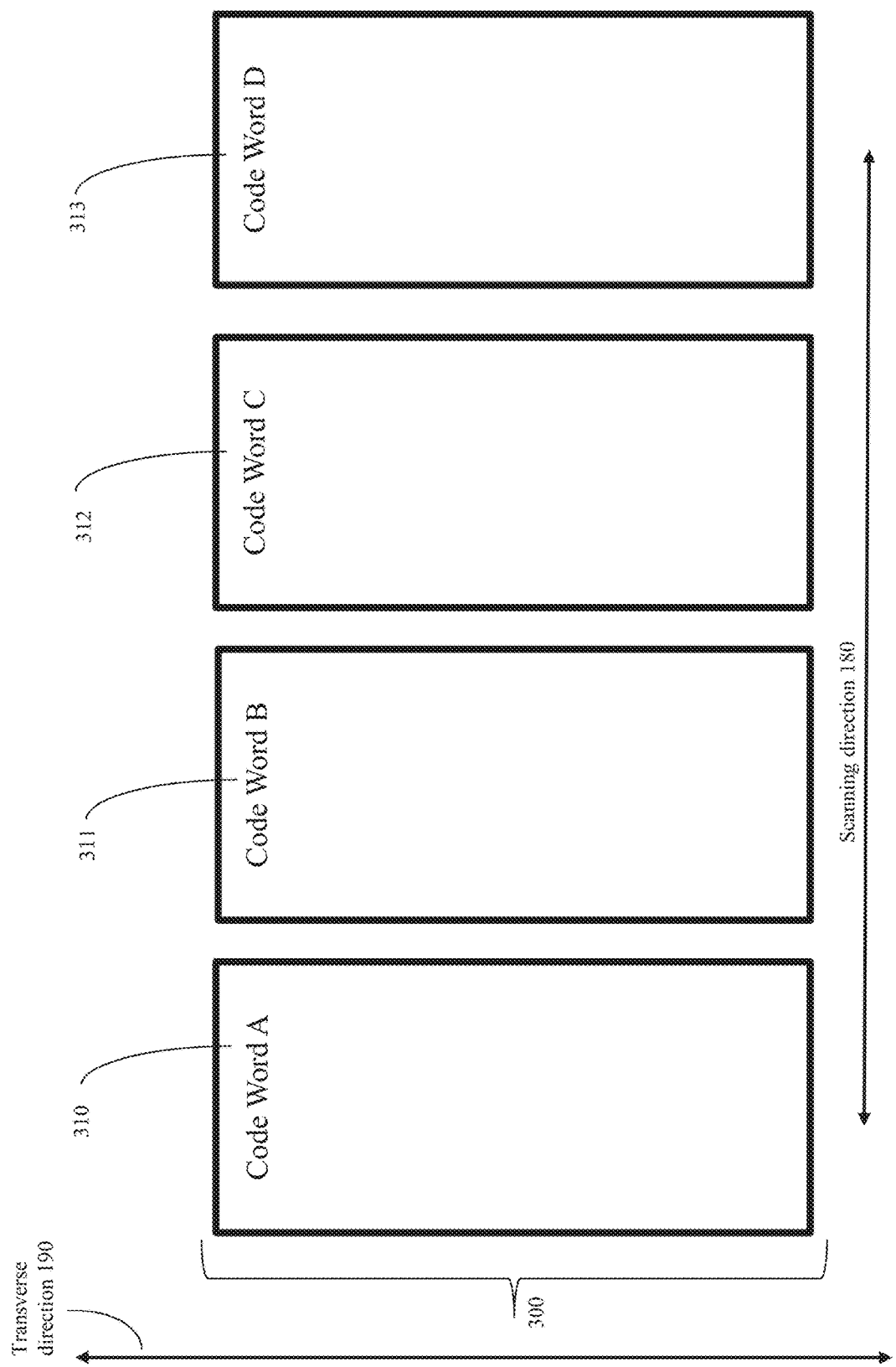
FIG. 12 is a schematic diagram of an embodiment in which the code words extend in a third direction (y axis) in a position location medium.
Figure 13:
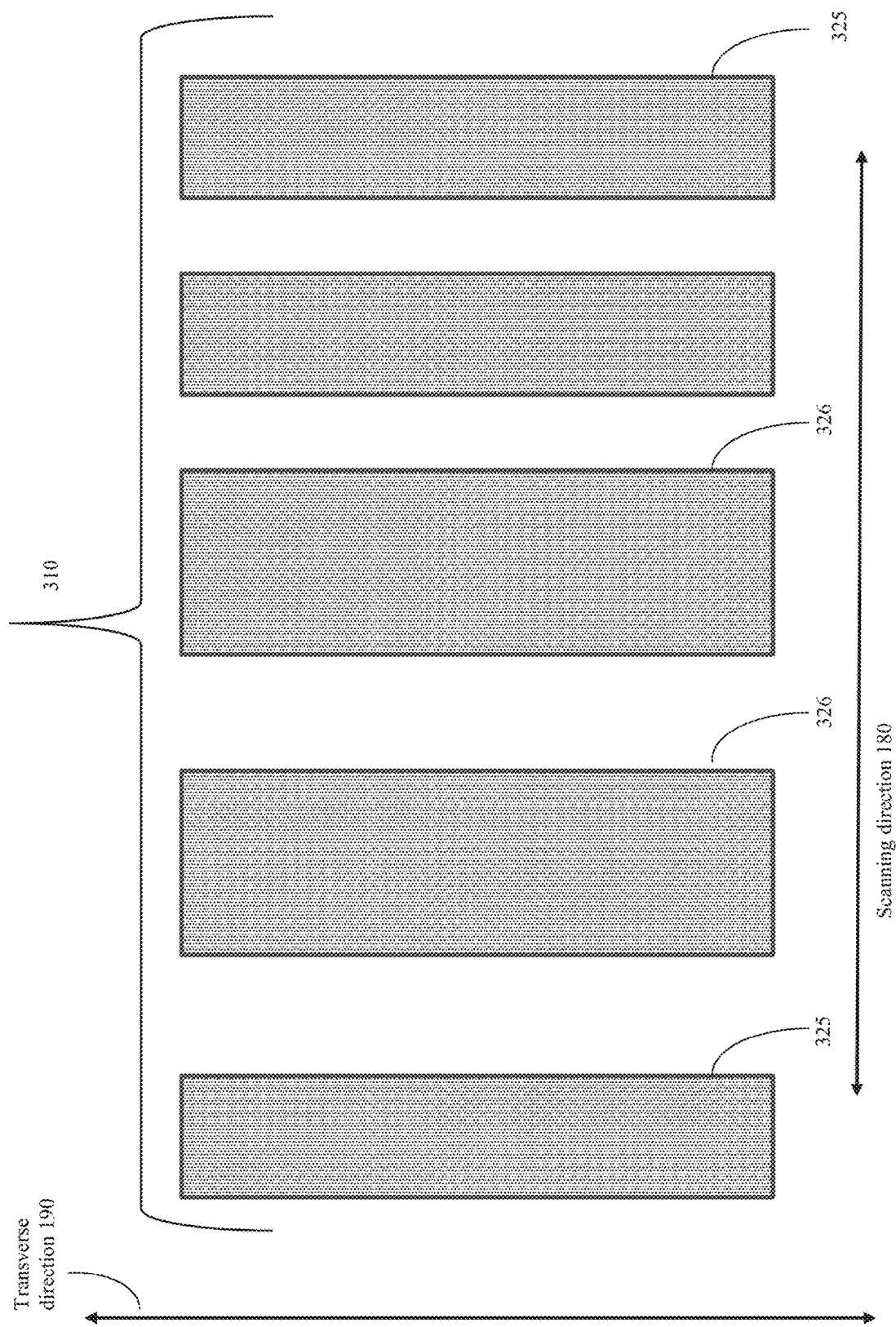
FIG. 13 is a schematic diagram of an example of individual portions of an extended code word in a third direction (y axis) in position location medium.

FIGS. 12 and 13 illustrate that code words 110, 111, 112, 113 may be implemented by extension of individual portions 108, 109, 131, 132 or bits along the transverse direction to produce code words 310, 311, 312, 313. In this implementation, code words 310, 311, 312, 313 resemble a bar code as shown in FIG. 13 for one such code word 310. Using this arrangement, the transverse actuator and tracking control system may not be necessary, resulting in a simplification of the optical and the electronic systems of absolute position encoder system 10. In such an implementation, the position of focal point 4 in the transverse direction is determined by mechanical fixtures that have sufficient accuracy to insure that focal point 4 is always placed in position enabling the individual portions 325, 326, to be detected by code word detector 31. Code words 310, 311, 312, 313 may include a data portion 130 and an ECC portion 131 similar or identical to the code words 110, 111, 112, 113 described above.

Figure 14:
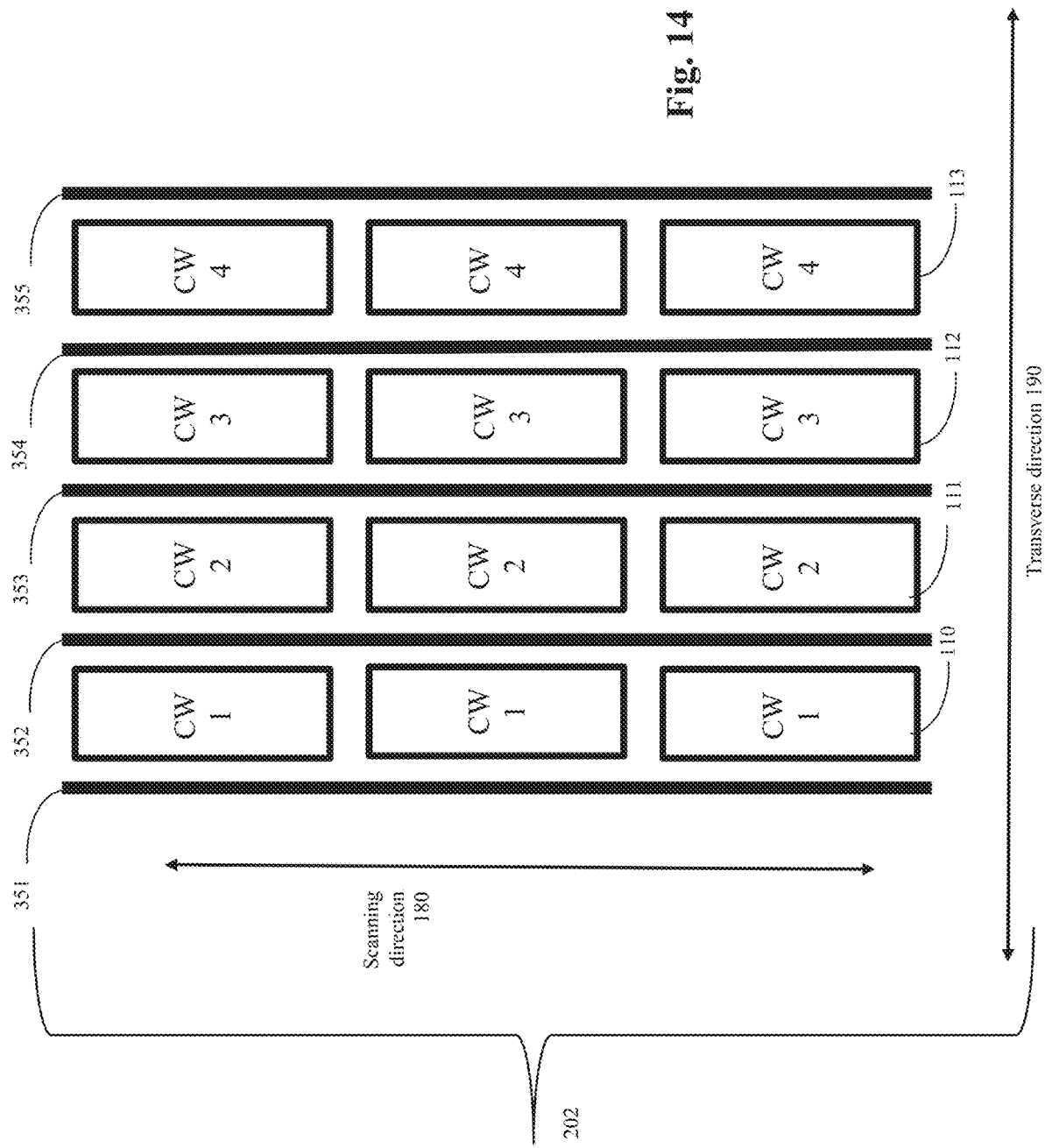
FIG. 14 is a schematic diagram of an alternative embodiment of position location medium with code words extending in a third direction in position location medium.
Figure 15:
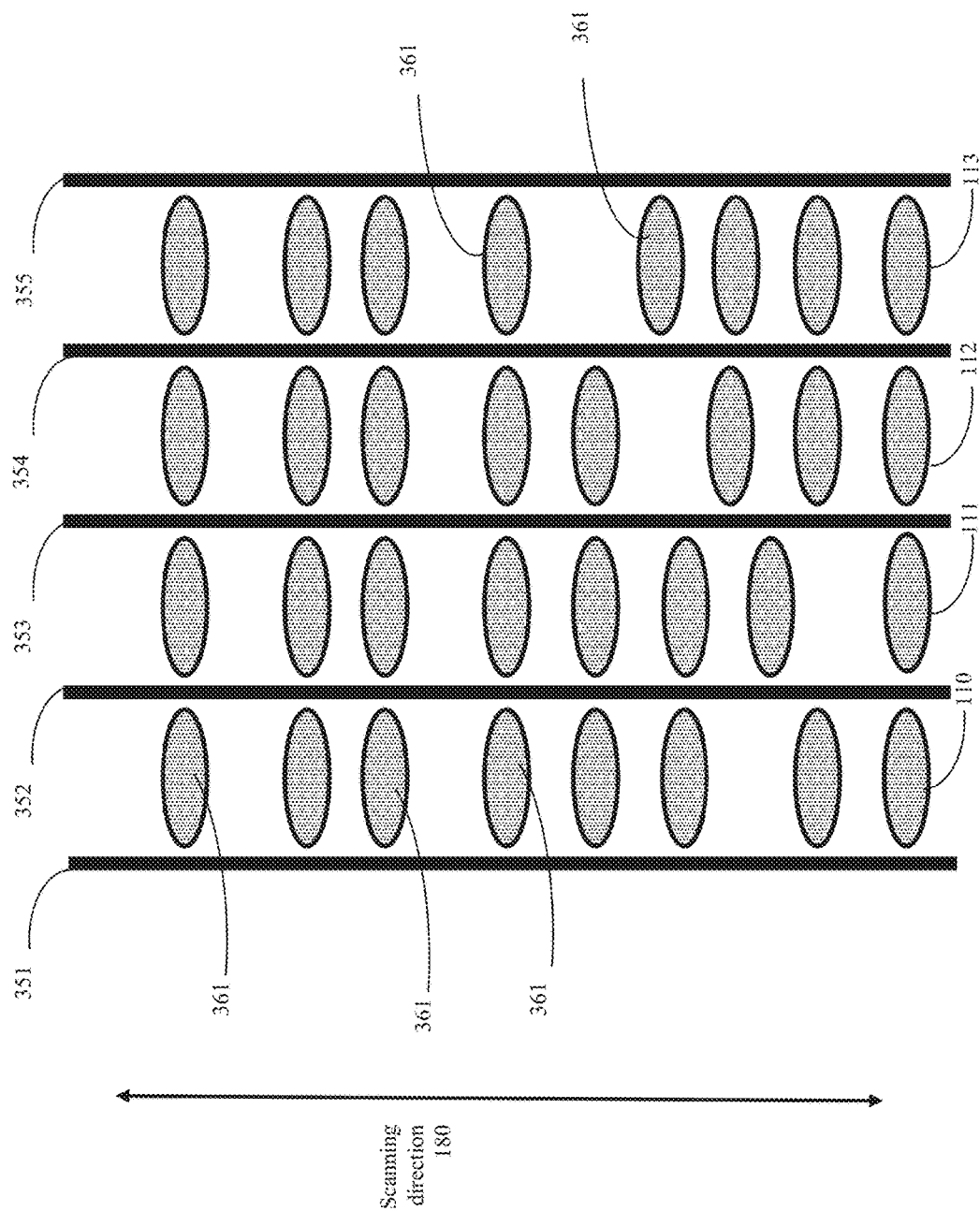
FIGS. 15-17 are schematic diagrams of examples of individual portions of code words extending in a third direction in position location medium.
Figure 16:
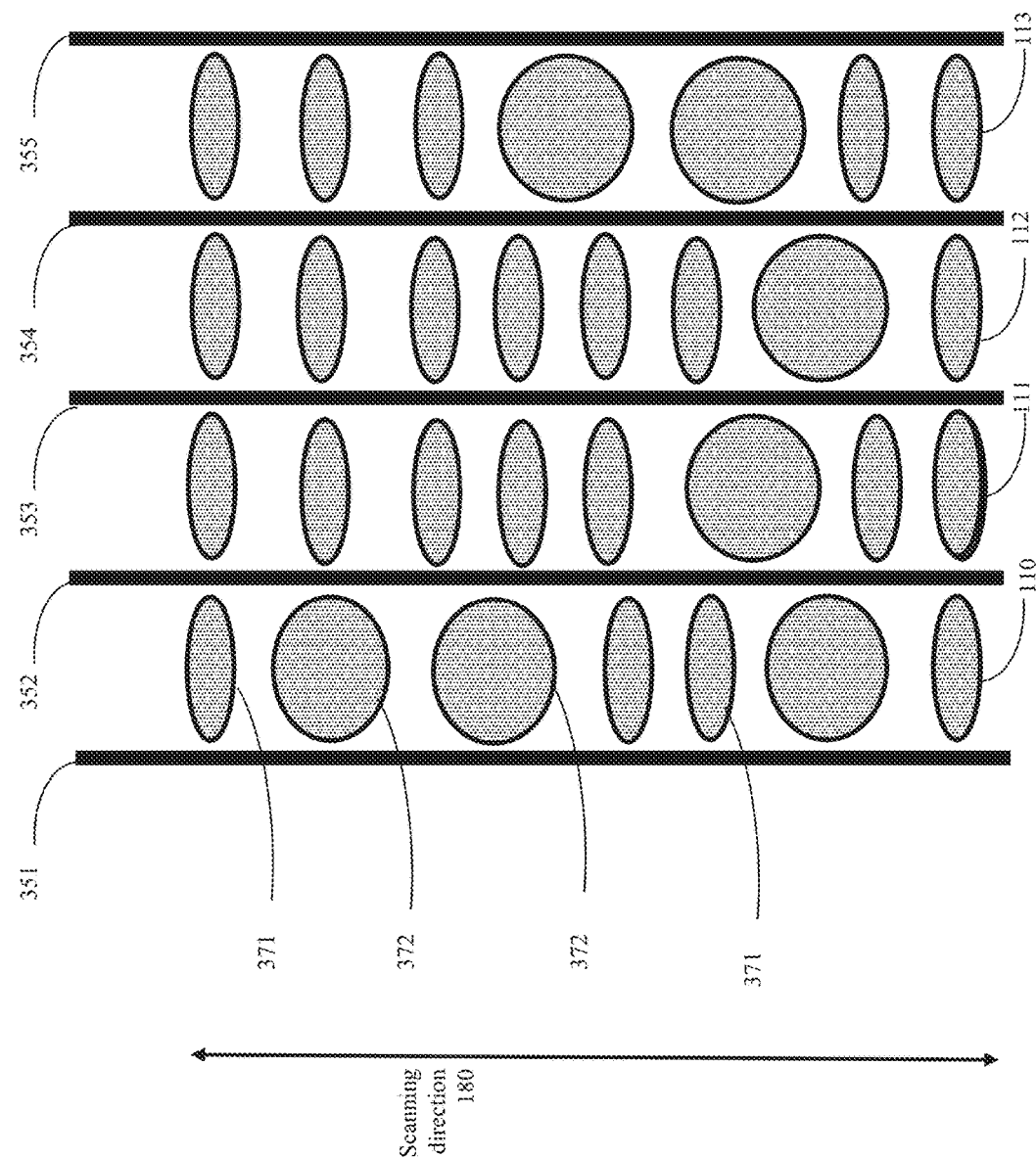
Figure 17:
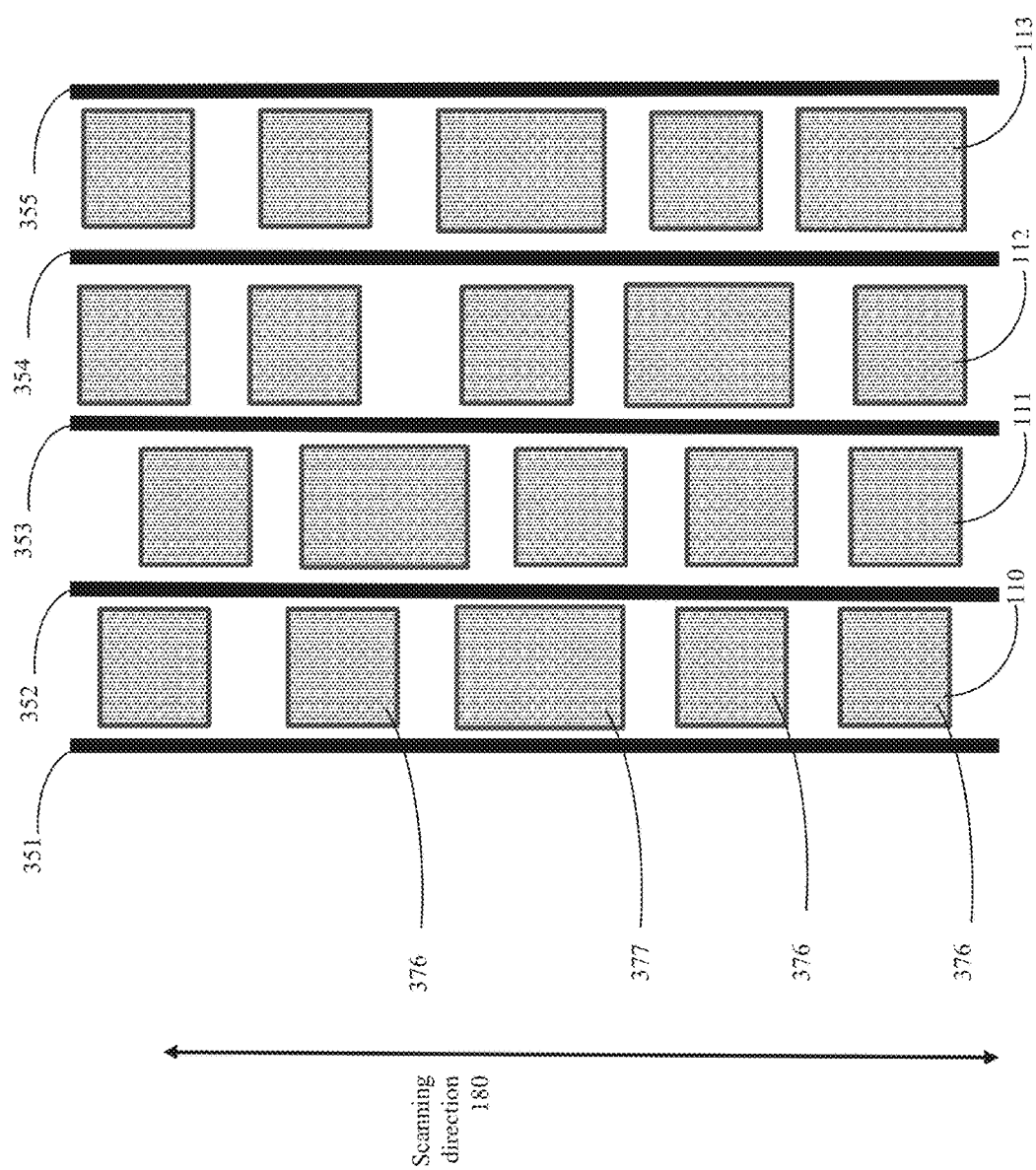

FIGS. 14-17 illustrate that an alternative position location medium 202 may be configured so that, code words 110, 111, 112, 113 are scanned vertically (as shown in FIG. 14) by the scanning actuator. This embodiment may be implemented by rotation of absolute position encoder 22 by 90 degrees about the z axis. Code words 110, 111, 112, 113 are redundant along the scanning direction 180. Position location medium (i.e. 16, 200, 202) moves along the transverse direction 190 as shown in FIG. 14. In this embodiment, diffraction detector 39 could be used count diffraction feature crossings of diffraction features (i.e. 351, 352, 353, 354, 355) and therefore produce an incremental signal as the position of position location medium (i.e. 16 or 200) varies relative to absolute position encoder 22 along the transverse direction 190. FIGS. 15-17 show different embodiments of code words 110, 111, 112, 113 using individual portions 361, 371, 372, 376, 377.

Figure 18:
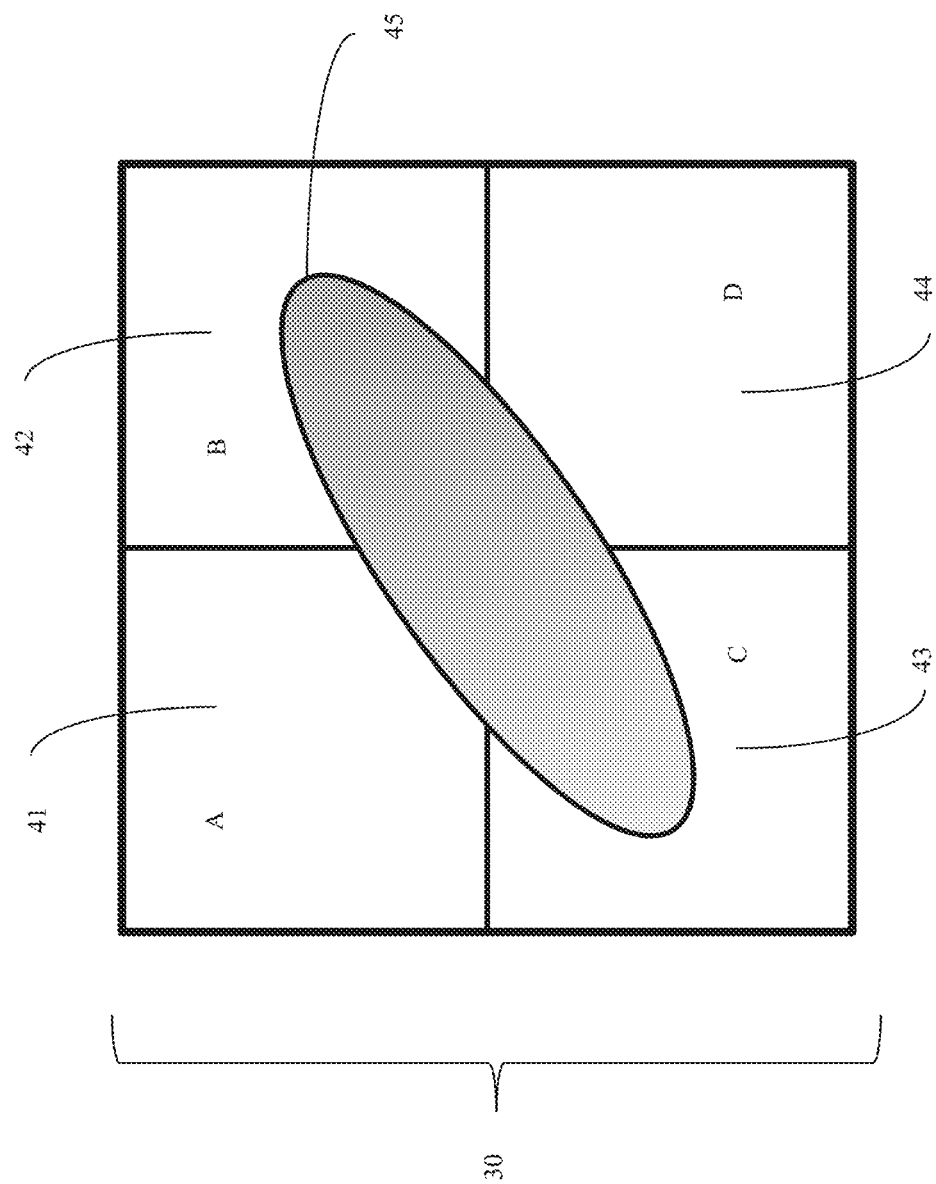
FIG. 18 is a schematic depiction of a focus detector with astigmatic out of focus beam.

FIG. 18 illustrates one embodiment of a focus detector 30, which is shown as having four independent sensing sections A, B, C, D. In this embodiment, lens 29 focuses return optical beam 15 on focus detector 30 with a prescribed amount of astigmatism. When focal point 4 is optimally in focus on code word 110, a circularly symmetric optical radiation beam impinges upon focus detector 30. When focal point 4 is focused beyond focus on code word 110, an elliptical optical radiation beam 45 impinges upon focus detector 30 as illustrated in FIG. 18. Elliptical optical radiation beam 45 provides a larger signal on sections B and C compared to sections A and D. When focal point 4 is focused in front of code word 110, an elliptical optical radiation beam 45 impinges upon focus detector 30 that provides a larger signal on sections A and D compared to sections B and C. The focus control system (see below) receives the focus condition from focus detector 30 by deriving a focus error signal FES as follows:

$$(FES)=((B+C)-(A+D))/(A+B+C+D).$$

When focal point 4 is optimally in focus on code word 110, FES=0. Either out of focus condition produces a corresponding FES signal with the correct polarity for focus control system 430 (FIG. 20) to correct the out of focus condition via focus actuator control signals that cause the focus actuator to move focus lens 35 in the direction to correct the out of focus condition. The focus control system is configured to have adequate bandwidth to maintain focal point 4 focused on code word 110, despite changes in the distance between absolute position encoder 22 and position location medium 16 in the z direction during normal operation. Other methods for focus detection (i.e. knife edge, etc.) may be used in alternative embodiments.

Figure 19:
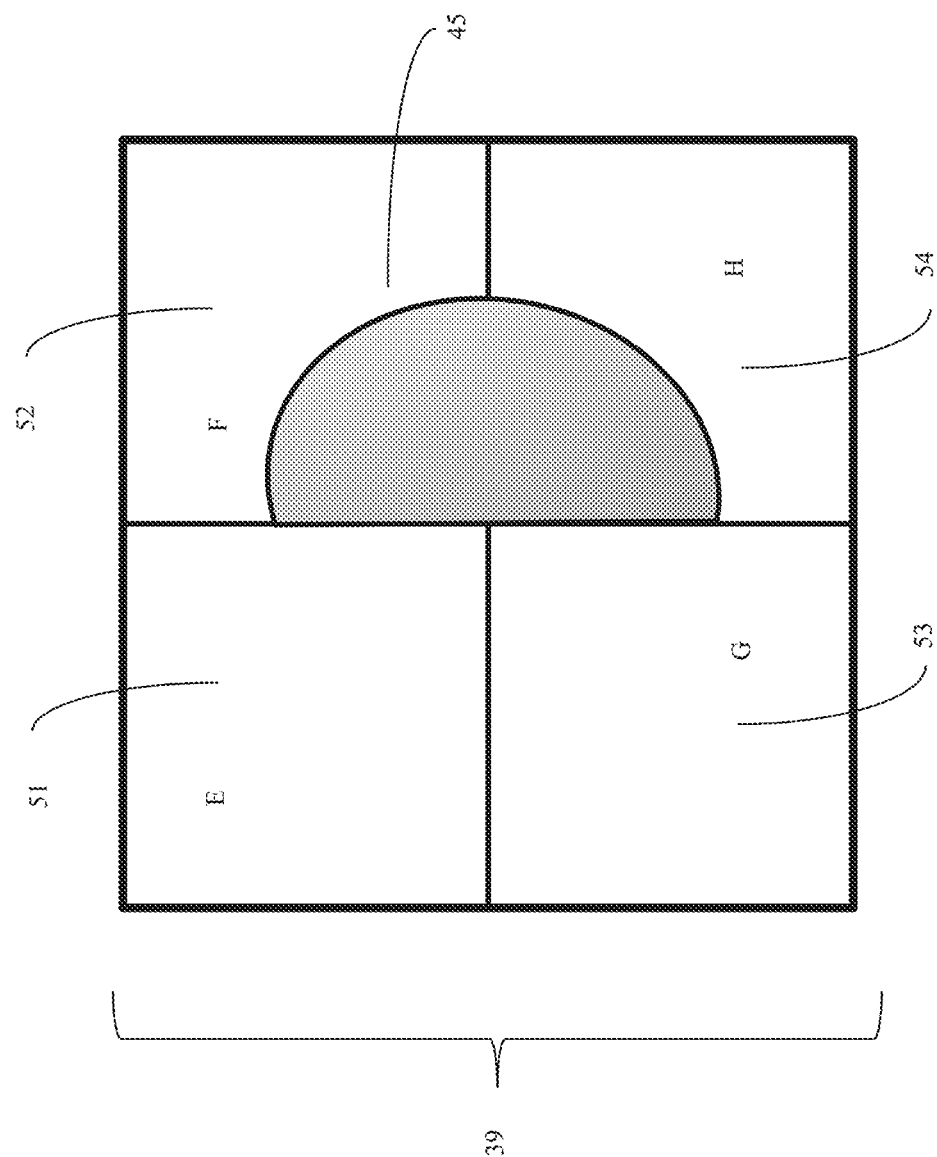
FIG. 19 is a schematic depiction of a diffraction detector with diffraction beam on detector.

FIG. 19 shows an embodiment of diffraction detector 39 as having four detector portions E, F, G, H. Operation and use of the diffraction detector 39 are described below.

Figure 20:
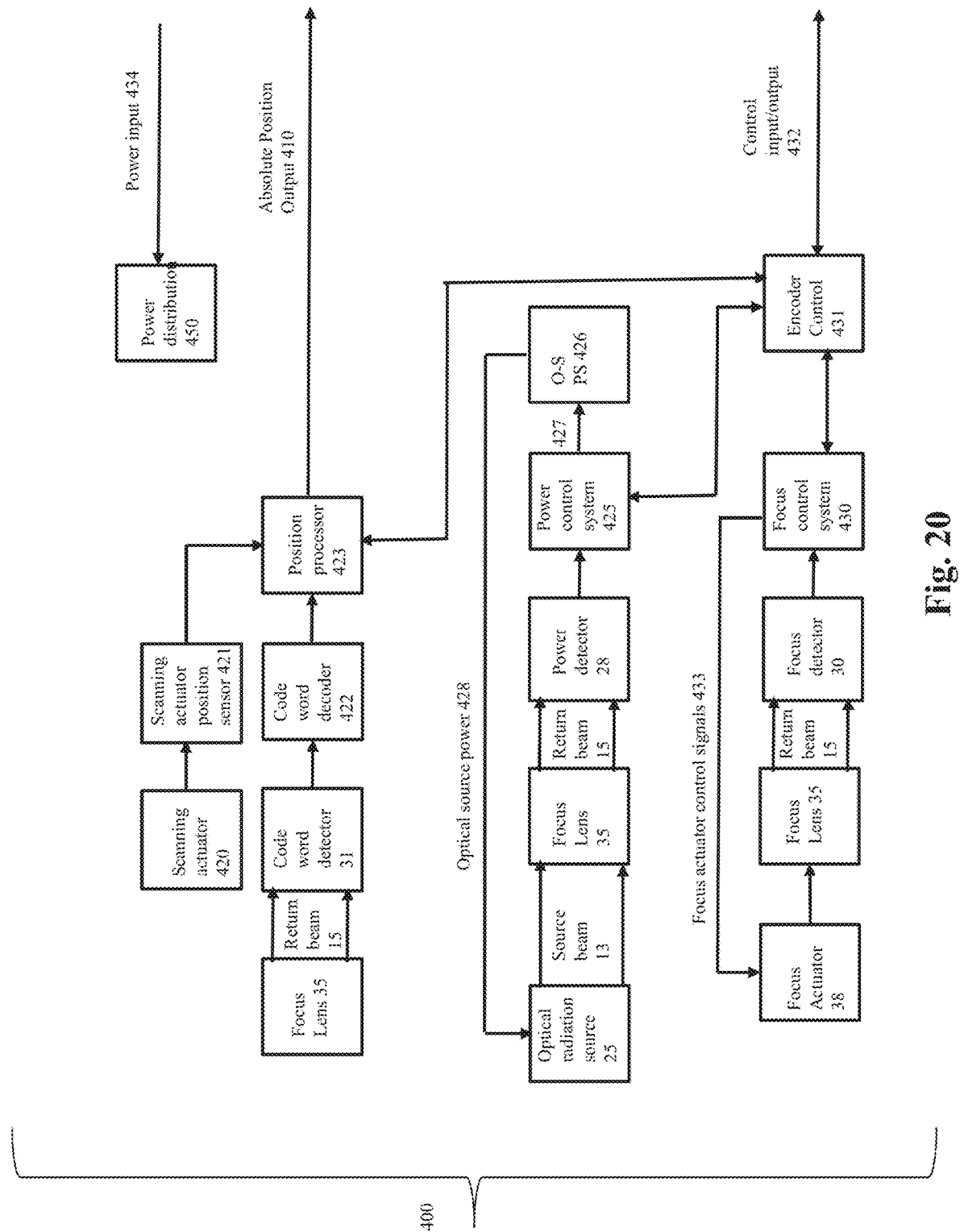
FIG. 20 is a system block diagram of an absolute position encoder.

FIG. 20 illustrates one embodiment of a system 400 for determining the absolute position of absolute position encoder 22 relative to position location medium 16. The system includes the following additional elements, some of which are mentioned above:

- 410 Absolute position output
- 420 Scanning actuator
- 421 Scanning actuator position sensor
- 422 Code word decoder
- 423 Position processor
- 425 Power control system
- 426 Optical Source power supply (O-S PS)
- 427 Optical radiation source power control signals
- 428 Optical source electrical power
- 430 Focus control system
- 431 Encoder control
- 432 Control input/output signals
- 433 Focus actuator control signals
- 434 Power input
- 450 Power distribution Some of the elements are shown multiple times in FIG. 20, illustrating different aspects of their functioning.

Focus control system 430 operates via the focus actuator 38 and focus lens 35 to maintain focal point 4 optimally in focus on code word 110. Scanning actuator 420 moves focal point 4 in a second direction transverse to the first direction and along more than one position identifier code word (i.e. 110, 111, 112, 113). Lens 32 focuses return optical beam 15 on code word detector 31. Code word detector 31 detects individual portions of position identifier code words (i.e. 110, 111, 112, 113). Scanning actuator 420 may be implemented by controlling the tilt of partially reflecting mirror 37 or by adding a second axis to focus actuator 38. Other implementations of scanning actuator 420 may be employed. In a preferred embodiment, scanning actuator 420 is a resonant scanner which would allow a large scanning velocity at an optimum resonant frequency. In a preferred embodiment, the scanning velocity should be at least ten times the expected relative velocity between absolute position encoder 22 relative to position location medium 16 during normal operation. Code word decoder 422 receives the output from code word detector 31 to decode a numerical value of at least one code word (i.e. 110, 111, 112, 113). Position processor 423 receives the numerical value of position identifier code word (i.e. 110, 111, 112, 113) and the exact position of scanning actuator 420 from scanning actuator position sensor 421 to produce absolute position output 410. Absolute position output 410 is the absolute position of position encoder 22 relative to position location medium 16. Position processor 423 computes the absolute position of position identifier code word (i.e. 110, 111, 112, 113) and also by detecting the transitions between each of the individual portions or bits of code word 110 and using the position of scanning actuator 420 determines the location of focal point 4 to a subdivision of a single bit length that is limited only by the signal to noise ratio of detecting an edge of a single bit of code word 110.

Figure 21:
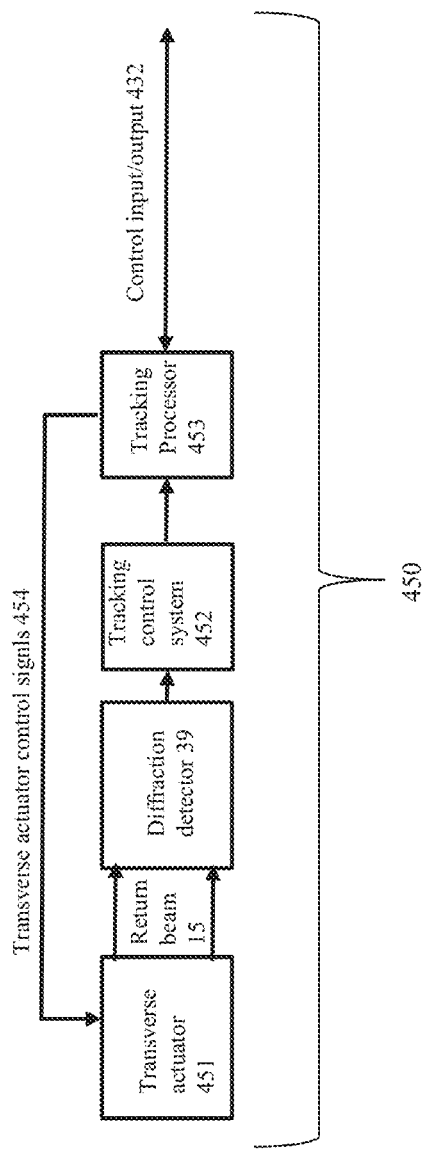
FIG. 21 is a block diagram of a transverse actuator control system.

FIG. 21 shows an embodiment of a transverse actuator control system 460. The transverse actuator 451 moves the focal point 4 in the transverse scanning direction 190 across diffraction features (i.e. 103-107, 127-129) and/or diffraction features (i.e. 135, 136, 137). As described above, code words 110, 111, 112, 113 may be separated by diffraction features. Lens 36 focuses a portion of return optical beam 15 on diffraction detector 39, an example of which is shown in FIG. 19 and described briefly above. Referring briefly back to FIG. 19, when focal point 4 moves across a diffraction feature (i.e. 127, 128, 129) an optical radiation beam 45 moves from sections (H+F) to (E+G). Each crossing of diffraction feature (i.e. 127, 128, 129) causes optical radiation beam 45 to move back and forth between the left and right halves of diffraction detector 39. When focal point 4 is between two diffraction features and located on a code word (i.e. 110, 111, 112, 113) optical radiation beam 45 provides equal power on the left and right halves of diffraction detector 39.

Returning to FIG. 21, tracking control system 452 receives a signal from diffraction detector 39 and provides a signal to tracking processor 453. Tracking processor 453 maintains a tracking position requested by commands received via control input/output 432. Tracking processor 453 may be commanded to maintain focal point 4 on a specific position identifier code word (i.e. 110, 111, 112, 113). In one embodiment, where redundant code words (i.e. 110, 111, 112, 113) are present in the transverse direction 190, tracking processor 453 may be commanded to move to a redundant code word because the current code word has a defect. Transverse actuator 451 may be implemented by controlling the tilt of partially reflecting mirror 37 or by adding a second or third axis to focus actuator 38. Other implementations of transverse actuator 451 may be employed.

Operation

An operational sequence is provided below, with the aid of a specific example.

In addition to the various hardware features described above, another aspect of the present disclosure concerns a method for operation of absolute position encoder 22. This method may be implemented, for example, by operating absolute position encoder 22 to execute a sequence of machine-executable instructions. Such instructions may reside in any of various types of data storage media. In this respect, one aspect concerns an article of manufacture having a data storage medium tangibly embodying a program of machine-readable instructions executable by a digital data processor to perform method steps to operate absolute position encoder 22.

This data storage medium may include, for example, volatile or non-volatile memory in absolute position encoder 22. Alternatively, the instructions may be contained in another data storage medium, such as a magnetic data storage diskette. Whether contained in absolute position encoder 22 or elsewhere, the instructions may instead be stored on another type of data storage medium such as RAM, DASD storage (e.g., a conventional "hard drive" or a RAID array), magnetic tape, electronic read-only memory (e.g., ROM), optical storage device (e.g., WORM), or other data storage media.

In the illustrated embodiment, where the machine-readable instructions reside in absolute position encoder 22, the machine-readable instructions may include lines of compiled assembly language code.

Figure 22:
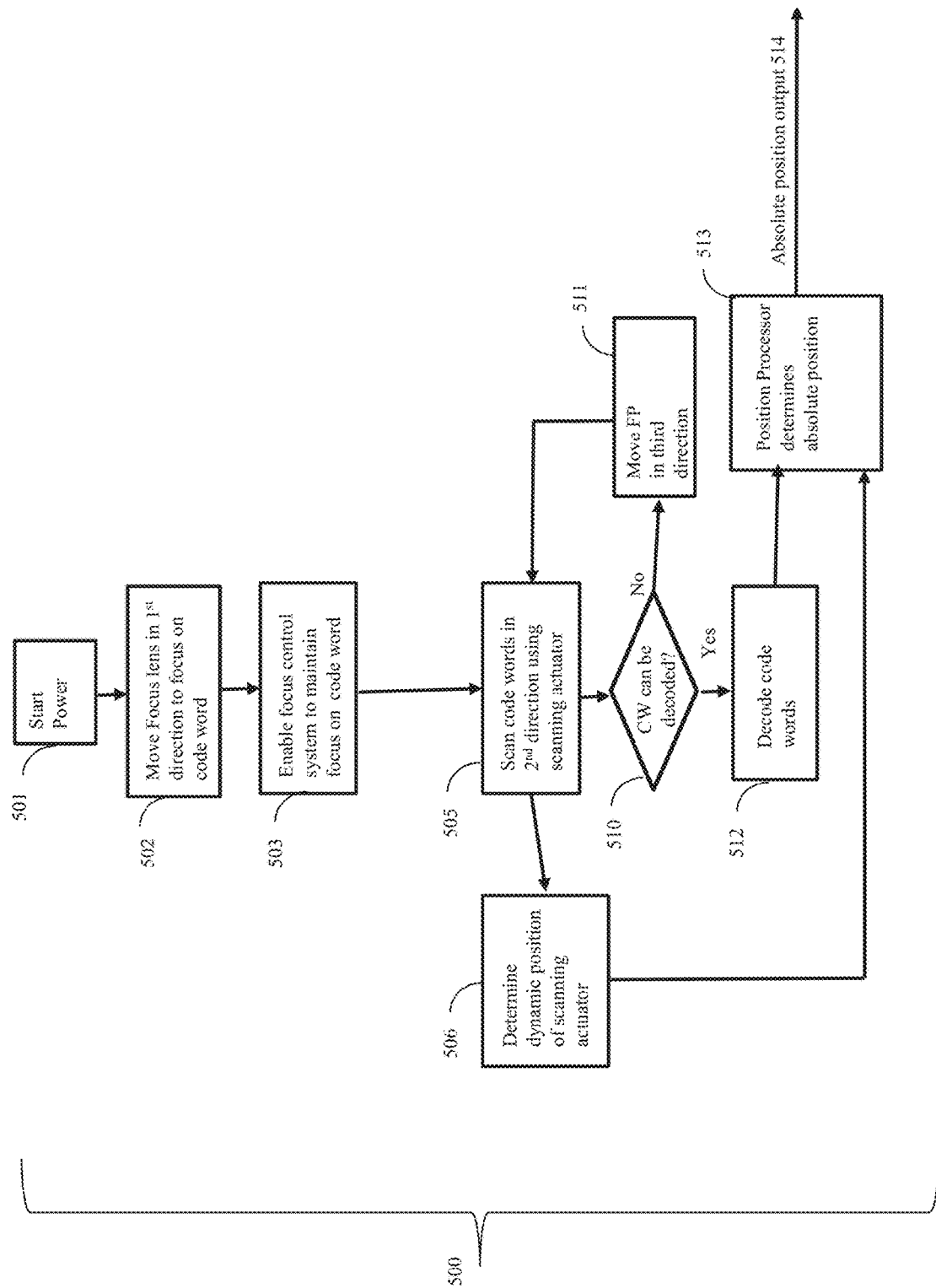
FIGS. 22 and 23 are flowcharts of operation of an absolute position encoder.

FIG. 22 illustrates an aspect of operation according to one embodiment 500, and is described along with reference to the optical schematic of FIG. 6 and the system diagram 400 of FIG. 20. At step 501 the system is powered on, for example, by power input 434. At step 502 the system moves focus lens 35 in a first direction to focus focal point 4 on position identifier code word (i.e. 110, 111, 112, 113). At step 503 the system enables focus control system 430 to maintain focal point 4 on position identifier code word (i.e. 110, 111, 112, 113). At step 505 the system scans position identifier code word (i.e. 110, 111, 112, 113) in the second direction using scanning actuator 420. At step 506 the system determines a dynamic position of scanning actuator 420. At step 510 the system verifies that position identifier code word (i.e. 110, 111, 112, 113) is decodable and, if so, decodes position identifier code word (i.e. 110, 111, 112, 113) at step 512. Decoding position identifier code word (i.e. 110, 111, 112, 113) is accomplished by decoding data portion 130 and optionally if present ECC portion 131. ECC portion 131 may be used during decoding to correct data portion 130. If at step 510 position identifier code word (i.e. 110, 111, 112, 113) cannot be decoded, then at step 511 the focal point 4 is moved in a third direction to access another portion of position identifier code word (i.e. 110, 111, 112, 113) or in another embodiment access a redundant code word as described with reference to FIG. 7 or FIG. 14. From step 511, control flows to step 505 to scan the code word again and go to step 510 to verify that position identifier code word (i.e. 110, 111, 112, 113) is decodable. From step 512, control flows to step 513 where position processor 423 determines an absolute position 514. At step 506, the dynamic position of scanning actuator 420 is determined. At step 513, position processor 423 processes a numerical value of position identifier code word 110 and the dynamic position of scanning actuator 420 to produce an absolute position 514 of absolute position encoder 22 relative to position location medium 16. Absolute position 514, may include a coarse absolute position, fine absolute position, and further subdivisions of fine absolute position as explained below for one embodiment.

Figure 23:
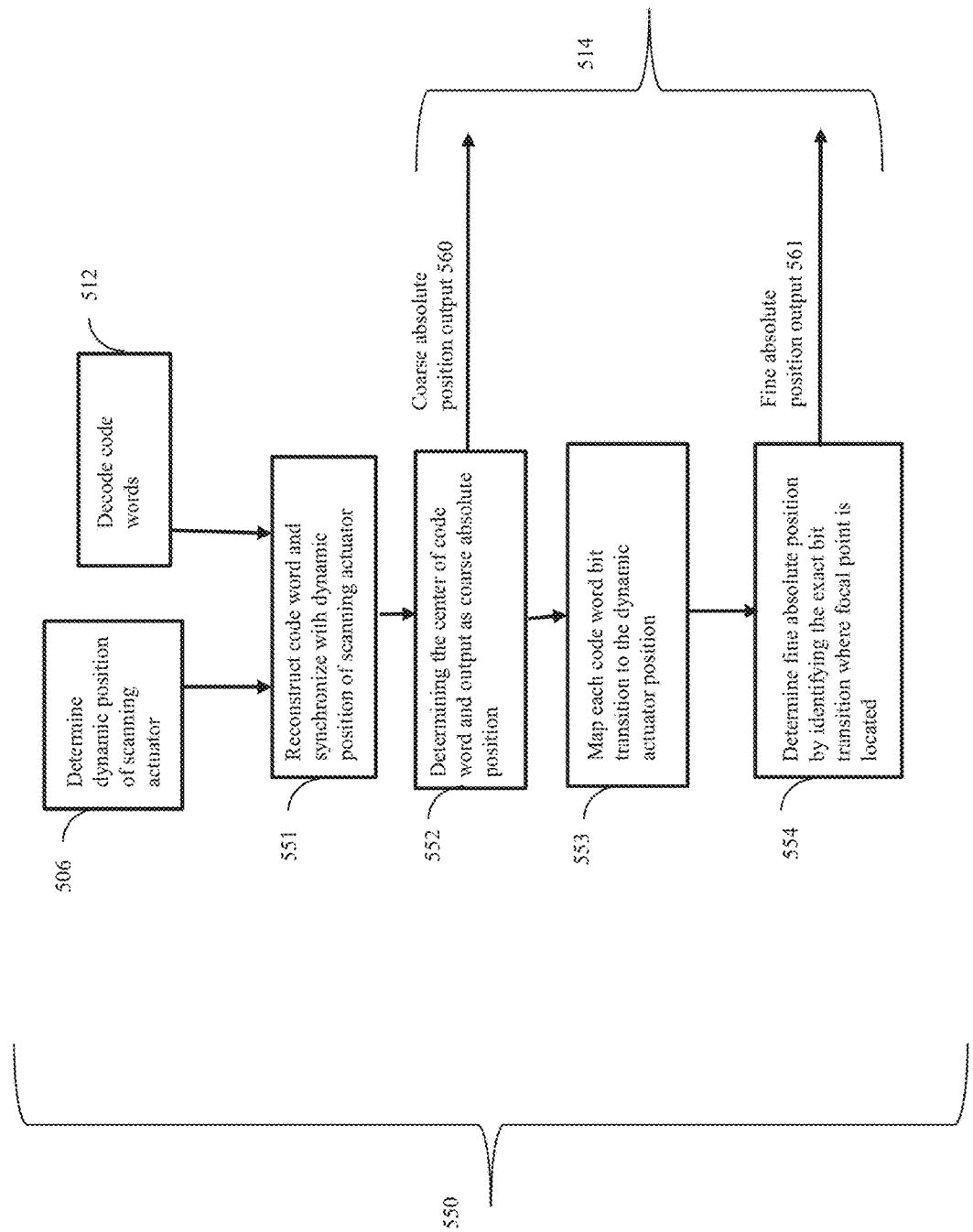
Figure 24:
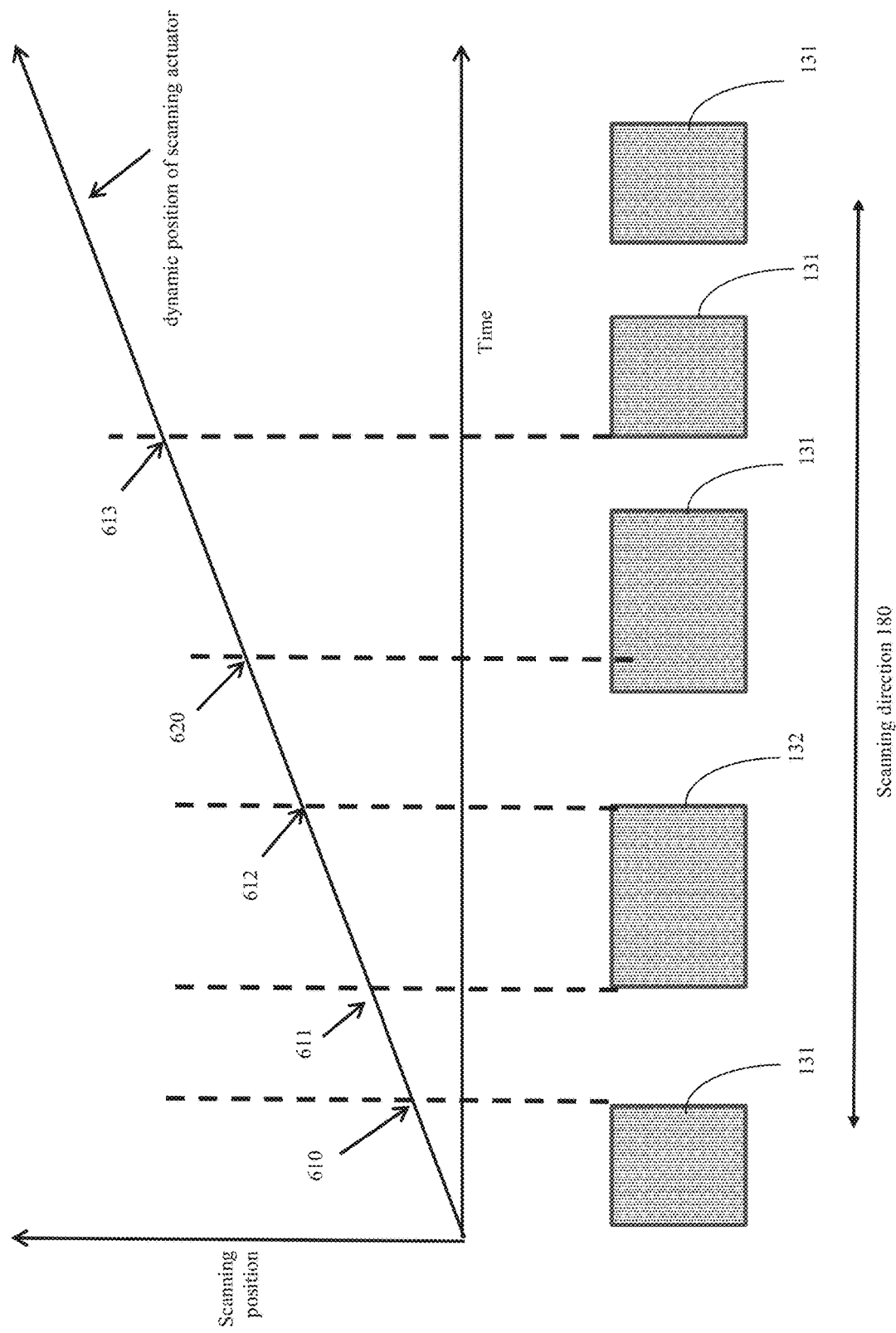
FIG. 24 is a schematic depiction of determination of absolute position encoder bit subdivision.

FIG. 23 shows method steps 550 to implement the absolute position determining step 513 of the process of FIG. 21. Operation is described with additional reference to FIG. 24. At step 506 the dynamic position of scanning actuator 420 is determined. At step 551, the system reconstructs position identifier code word 110 to produce a numerical value from the results of step 512 of decoding position identifier code word 110. Also at step 551, the system synchronizes position identifier code word 110 with the dynamic position of scanning actuator 420. At step 552, the system determines a coarse absolute position 560 by determining the center of a position identifier code word 110. Referring to FIG. 24, an example of the individual portions (i.e. 131, 132) of position identifier code word 110 are shown in time alignment with the dynamic position of scanning actuator 420. For illustration purposes, only five individual portions (i.e. 131, 132) are shown. Coarse absolute position 560 may be determined by finding the intersection 620 of the center of position identifier code word 110 and the corresponding dynamic position of scanning actuator 420. Any processing delay resulting from position processor 423 may be compensated by correcting the coarse absolute position 560 by the current relative velocity between absolute position encoder 22 and position location medium 16. The relative velocity between absolute position encoder 22 and position location medium 16 may be determined by, for example, computation of the acceleration and velocity from recent absolute position data stored, for example, in memory locations accessible by position processor 423.

At step 553 of the process of FIG. 23, the dynamic actuator position is mapped to individual portions (i.e. 131, 132) of position identifier code word 110. Referring again to FIG. 24, an example of the individual portions (i.e. 131, 132) of position identifier code word 110 are shown in time alignment with the dynamic position of scanning actuator 420. At step 554, the system determines a fine absolute position 561 by determining a position of each of individual portions 131, 132 of position identifier code word 110. Fine absolute position 561 may be determined by finding the intersections (i.e. 610, 611, 612, 613) of individual portions (i.e. 131, 132) of position identifier code word 110 and the corresponding dynamic position of scanning actuator 420. Any processing delay resulting from position processor 423 may be compensated by correcting the fine absolute position 561 by the current relative velocity between absolute position encoder 22 relative and position location medium 16. Fine absolute position 561 may be determined to a very high accuracy by further subdividing the time period between each intersection (i.e. 610, 611, 612, 613) of individual portions (i.e. 131, 132) of position identifier code word 110 and the corresponding dynamic position of scanning actuator 420. Using the disclosed method by further subdividing the time period between each intersection (i.e. 610, 611, 612, 613) absolute position encoder 22 can produce a fine absolute position 561 that is accurate to a few nanometers when each intersection (i.e. 610, 611, 612, 613) is spaced by sub-microns.

In another embodiment, absolute position encoder 22 may be used with code word arrangements like those of FIGS. 7 and 14, but rather than replicating each code word (e.g., code word 1) in the transverse direction 190, employing additional unique code words so as to produce two-dimensional position encoding. For example, moving from bottom to top in FIG. 7 along transverse direction 190 focal spot 4 would scan code word 1$a$, code word 1$b$, code word 1$c$, etc. rather than replicated versions of code word 1. Code words 2, 3, 4, etc. are configured in a similar manner. This configuration could also be applied to the configuration of code words shown in FIG. 14. By using the diffraction features (i.e. 103, 104, 105, 106, 107, 351, 352, 353, 354, 355) a two dimensional absolute position encoder could be implemented using the systems and methods described herein.

In yet another embodiment, position identifier code word (i.e. code words 110, 111, 112, 113), may be written into code word medium 101 by absolute position encoder 22 or an alternative machine capable of altering code word medium 101. Depending upon the code word medium 101 used, individual portions 108, 109, 131, 132 or bits of a code word 110 may be written into code word medium 101 by polarization variations, ablation, amorphous to crystalline phase change, color change or other physical methods.

While various embodiments have been particularly shown and described, it will be understood by those skilled in the art that various changes in form and details may be made therein without departing from the scope of the appended claims.

What is claimed is:

1. An absolute position encoder comprising:
   a position location medium patterned to form a set of position identifier code words, the code words each comprising individual portions and providing respective absolute position indications, the code words passing through an interrogation location of the absolute position encoder during operation thereof;
   an optical source configured and operative to generate a source beam of optical radiation;
   an optical detector configured and operative to convert a return beam of optical radiation to a corresponding electrical detector signal, the detector signal conveying a property of the return beam resulting from interaction of the source beam with the position location medium at the interrogation location;

an optics subsystem configured and operative to focus the source beam onto the position location medium at the interrogation location and to direct the return beam from the interrogation location of the position location medium to the optical detector, the optics subsystem being further configured and operative to detect a focus condition from the return beam and, in response to the focus condition, automatically adjust the focus of the source beam in a first direction substantially perpendicular to the surface of the position location medium to maintain a predetermined focus condition during operation of the absolute position encoder; and a code word decoder configured and operative in response to the detector signal to detect a code word at the interrogation location and generate a decoder output indicative of a corresponding code word value and corresponding detected position.

2. The absolute position encoder of claim 1 wherein the optics subsystem includes:

a scanning actuator for moving the focal point in a second direction transverse to the first direction and along the position identifier code word.

3. The absolute position encoder of claim 2 wherein the optics subsystem includes a transverse actuator for moving the focal point in a third direction that is transverse to the second direction and transverse to the first direction, the moving occurring to maintain tracking of the focal point as it is being scanned along the position identifier code word.

4. The absolute position encoder of claim 3 wherein more than one redundant position identifier code words are separated by one or more diffraction features in the position location medium, and further comprising a diffraction detector for detecting a diffraction condition of the return optical beam, wherein the diffraction condition is used to determine the position of the focal point in the third direction.

5. The absolute position encoder of claim 2 wherein:

the individual portions of the position identifier code words are arrayed in an x direction of relative movement for which the detected position is indicated, and the second direction is substantially the x direction.

6. The absolute position encoder of claim 5 further comprising a transverse actuator for moving the focal point in a third direction that is transverse to the second direction and transverse to the first direction, the moving occurring to maintain tracking of the focal point as it is being scanned along the position identifier code word.

7. The absolute position encoder of claim 6 further comprising more than one redundant position identifier code word along the third direction in the position location medium, and wherein the transverse actuator is configured and operative to move the focal point among redundant position identifier code words in the third direction.

8. The absolute position encoder of claim 5 wherein:

the individual portions of the position identifier code words are extended in a third direction that is transverse to the second direction and transverse to the first direction, and a position of the focal point in the third direction is fixed by mechanical fixtures with corresponding tolerances to ensure accurate scanning of the code words.

9. The absolute position encoder of claim 2 wherein:

the individual portions of the position identifier code words are arrayed in a y direction transverse to an x direction of relative movement for which the detected position is indicated, and the second direction is substantially the y direction.

10. The absolute position encoder of claim 9 further comprising a transverse actuator for moving the focal point in a third direction that is substantially the x direction, the moving occurring to move the focal point between successive code words and to maintain tracking of the focal point as it is being scanned along each position identifier code word.

11. The absolute position encoder of claim 10 further comprising more than one redundant position identifier code word along the second direction in the position location medium, and wherein the scanning actuator is configured and operative to move the focal point among redundant position identifier code words in the second direction.

12. The absolute position encoder of claim 2 further comprising:

a scanning actuator position sensor to determine a position of the scanning actuator;

a position processor receiving the decoder output from the code word decoder and the position of the scanning actuator to produce an absolute position of the position encoder relative to the position location medium.

13. The absolute position encoder of claim 12 wherein transitions between individual portions of the position identifier code word and the position of the scanning actuator produces an absolute position accuracy of a subdivision of one or more of the individual portion of the position identifier code word.

14. The absolute position encoder of claim 1 wherein the optics subsystem includes:

a focus lens configured and operative to focus the source optical radiation beam to a focal point on the position identifier code word, the focus lens receiving a reflected optical beam from the position identifier code word to produce the return beam;

a focus detector configured and operative to detect the focus condition from the return beam;

a focus actuator configured and operative to move the focus lens in the first direction to move the focal point relative to the position identifier code word in the first direction; and a focus control system configured and operative to receive the focus condition from the focus detector and control the focus actuator to maintain the focal point upon the code word.

15. The absolute position encoder of claim 1 wherein the individual portions of the position identifier code word comprise one or more of reflectivity variations, polarization variations, and phase pit variations in the position location medium.

16. The absolute position encoder of claim 1 wherein each position identifier code word comprises a data portion and an error correction portion.

17. A method for determining an absolute position using an absolute position encoder, the absolute position encoder including a position location medium, an optical source, an optical detector, an optics subsystem and a code word decoder, the position location medium being patterned to form a set of position identifier code words each comprising individual portions and providing respective absolute position indications, the code words passing through an interrogation location of the absolute position encoder during operation thereof, the optical source configured and operative to generate a source beam of optical radiation, the optical detector configured and operative to convert a return beam of optical radiation to a corresponding electrical detector signal, the detector signal conveying a property of the return beam resulting from interaction of the source beam with the position location medium at the interrogation location, the optics subsystem configured and operative to focus the source beam onto the position location medium at the interrogation location and to direct the return beam from the interrogation location of the position location medium to the optical detector, the method comprising:

by the optics subsystem, detecting a focus condition from the return beam and, in response to the focus condition, automatically adjusting the focus of the source beam in a first direction substantially perpendicular to the surface of the position location medium to maintain a predetermined focus condition during operation of the absolute position encoder; and by the code word decoder, in response to the detector signal, detecting a code word at the interrogation location and generating a decoder output indicative of a corresponding code word value and corresponding detected position.

18. The method of claim 17, wherein the position identifier code word is extended in a third direction transverse to the first direction and transverse to a second direction in which the detected position is indicated by the decoder output, and further including a step of verifying that the position identifier code word is decodable by:

initially detecting that a first portion of the position identifier code word is not decodable;

subsequently moving the focal point in the third direction and scanning a second portion of the position identifier code word; and verifying that the second portion of the position identifier code word is decodable.

19. The method of claim 17, further including a processing step including:

reconstructing the position identifier code word and synchronizing the position identifier code word with the dynamic position of a scanning actuator;

determining a coarse absolute position by determining the center of the position identifier code word; and determining a fine absolute position by determining a position of each of the individual portions of the position identifier code word.

20. An article of manufacture comprising a non-transitory data storage medium tangibly embodying a program of machine-readable instructions executable by a digital processing apparatus to perform method steps for determining an absolute position using an absolute position encoder, the absolute position encoder including a position location medium, an optical source, an optical detector, an optics subsystem and a codeword decoder, the position location medium being patterned to form a set of position identifier code words, the code words each comprising individual portions and providing respective absolute position indications, the code words passing through an interrogation location of the absolute position encoder during operation thereof, the optical source configured and operative to generate a source beam of optical radiation, the optical detector configured and operative to convert a return beam of optical radiation to a corresponding electrical detector signal, the detector signal conveying a property of the return beam resulting from interaction of the source beam with the position location medium at the interrogation location, the optics subsystem configured and operative to focus the source beam onto the position location medium at the interrogation location and to direct the return beam from the interrogation location of the position location medium to the optical detector, the method steps comprising:

using the optics subsystem to detect a focus condition from the return beam and, in response to the focus condition, automatically adjusting the focus of the source beam in a first direction substantially perpendicular to the surface of the position location medium to maintain a predetermined focus condition during operation of the absolute position encoder; and using the code word decoder, in response to the detector signal, to detect a code word at the interrogation location and generating a decoder output indicative of a corresponding code word value and corresponding detected position.

\* \* \* \* \*